(12) United States Patent
Alattar et al.

(10) Patent No.: US 12,482,053 B2
(45) Date of Patent: Nov. 25, 2025

(54) SYSTEM FOR MITIGATING THE PROBLEM OF DEEPFAKE MEDIA CONTENT USING WATERMARKING

(71) Applicant: Digimarc Corporation, Beaverton, OR (US)

(72) Inventors: Adnan M. Alattar, Tigard, OR (US); Ravi K. Sharma, Portland, OR (US); John A. Scriven, Oregon City, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 18/595,208

(22) Filed: Mar. 4, 2024

(65) Prior Publication Data

US 2024/0362738 A1 Oct. 31, 2024

Related U.S. Application Data

(63) Continuation of application No. 17/150,937, filed on Jan. 15, 2021, now Pat. No. 11,922,532.

(Continued)

(51) Int. Cl.
*G06F 21/00* (2013.01)
*G06F 18/22* (2023.01)
(Continued)

(52) U.S. Cl.
CPC ............ *G06T 1/0028* (2013.01); *G06F 18/22* (2023.01); *G06F 21/16* (2013.01); *G06T 1/005* (2013.01);
(Continued)

(58) Field of Classification Search
CPC ..... G06T 1/0028; G06T 1/005; G06T 1/0092; G06T 2201/0051; G06T 2201/0052;
(Continued)

(56) References Cited

U.S. PATENT DOCUMENTS

| 4,423,415 A | 12/1983 | Goldman |
| 5,161,210 A | 11/1992 | Druyvesteyn |

(Continued)

FOREIGN PATENT DOCUMENTS

| WO | 2012156774 | 11/2012 |
| WO | 2015100430 | 8/2015 |

OTHER PUBLICATIONS

Bay et al., "SURF: Speeded up Robust Features," Eur. Conf. on Computer Vision (1), pp. 404-417, 2006.

(Continued)

*Primary Examiner* — Ghazal B Shehni
(74) *Attorney, Agent, or Firm* — Klarquist Sparkman, LLP

(57) ABSTRACT

Watermarking media content, in combination with blockchain and distributed storage networks, prevents the proliferation of Deepfake content. Digital watermarks are embedded in the audio and video tracks of video clips of trusted content producers at the time the videos are captured or before they are distributed. The watermarks are detected at the social media network's portals, nodes, and back ends. The embedded watermark imparts a unique identifier to the video, that links it to a blockchain. The watermarks also allow video source tracking, integrity verification, and alteration localization. The watermark detectors can be standalone software applications, or they can be integrated with other applications. They are used to perform three main tasks: (1) they alert the Internet user when he watches an inauthentic news video, so that he may discard it, (2) they prevent a Deepfake content from propagating through the network (3) they perform forensic analysis to help track and remove Deepfake content postings.

20 Claims, 7 Drawing Sheets

Related U.S. Application Data

(60) Provisional application No. 62/961,657, filed on Jan. 15, 2020.

(51) Int. Cl.
  *G06F 21/16* (2013.01)
  *G06T 1/00* (2006.01)
  *G06V 20/40* (2022.01)
  *G06V 40/16* (2022.01)
  *G10L 19/018* (2013.01)

(52) U.S. Cl.
  CPC ............ *G06T 1/0092* (2013.01); *G06V 20/46* (2022.01); *G06V 40/16* (2022.01); *G06V 40/171* (2022.01); *G10L 19/018* (2013.01)

(58) Field of Classification Search
  CPC ..... G06T 2201/0061; G06T 2201/0601; G06F 18/22; G06F 21/16; G06F 2221/0733; G06F 21/645; G06V 20/46; G06V 40/16; G06V 40/171; G10L 19/018
  See application file for complete search history.

(56) References Cited

U.S. PATENT DOCUMENTS

| | | | | |
|---|---|---|---|---|
| 5,673,338 | A | 9/1997 | Denenberg | |
| 5,862,260 | A | 1/1999 | Rhoads | |
| 6,512,837 | B1 | 1/2003 | Ahmed | |
| 6,614,914 | B1 | 9/2003 | Rhoads | |
| 6,625,297 | B1 | 9/2003 | Bradley | |
| 6,636,615 | B1 | 10/2003 | Rhoads | |
| 6,674,876 | B1 | 1/2004 | Hannigan | |
| 6,694,041 | B1 | 2/2004 | Brunk | |
| 6,711,293 | B1 | 3/2004 | Lowe | |
| 6,771,797 | B2 | 8/2004 | Ahmed | |
| 6,823,075 | B2 | 11/2004 | Perry | |
| 6,978,036 | B2 | 12/2005 | Alattar | |
| 6,990,453 | B2 | 1/2006 | Wang | |
| 7,020,304 | B2 | 3/2006 | Alattar | |
| 7,054,461 | B2 | 5/2006 | Zeller | |
| 7,055,034 | B1 | 5/2006 | Levy | |
| 7,072,490 | B2 | 7/2006 | Stach | |
| 7,076,082 | B2 | 7/2006 | Sharma | |
| 7,139,408 | B2 | 11/2006 | Rhoads | |
| 7,246,239 | B2 | 7/2007 | Rodriguez | |
| 7,330,562 | B2 | 2/2008 | Hannigan | |
| 7,352,878 | B2 | 4/2008 | Reed | |
| 7,359,889 | B2 | 4/2008 | Wang | |
| 7,412,072 | B2 | 8/2008 | Sharma | |
| 7,486,827 | B2 | 2/2009 | Kim | |
| 7,516,074 | B2 | 4/2009 | Bilobrov | |
| 7,519,819 | B2 | 4/2009 | Bradley | |
| 7,567,721 | B2 | 7/2009 | Alattar | |
| 7,607,016 | B2 | 10/2009 | Brunk | |
| 7,856,116 | B2 | 12/2010 | Rodriguez | |
| 7,986,807 | B2 | 7/2011 | Stach | |
| 8,094,869 | B2 | 1/2012 | Reed | |
| 8,126,203 | B2 | 2/2012 | Rhoads | |
| 8,144,368 | B2 | 3/2012 | Rodriguez | |
| 8,190,901 | B2 | 5/2012 | Barr | |
| 8,989,883 | B2 | 3/2015 | Shah | |
| 9,449,357 | B1 | 9/2016 | Lyons | |
| 9,916,838 | B2 | 3/2018 | Grant | |
| 9,928,561 | B2 | 3/2018 | Filler | |
| 9,965,628 | B2 | 5/2018 | Ford | |
| 10,147,433 | B1 | 12/2018 | Bradley | |
| 10,594,689 | B1 | 3/2020 | Weaver | |
| 11,481,786 | B2 * | 10/2022 | Diehl | H04L 9/3239 |
| 11,922,532 | B2 | 3/2024 | Alattar | |
| 2003/0191941 | A1 * | 10/2003 | Terada | H04N 1/32325 713/176 |
| 2003/0223584 | A1 * | 12/2003 | Bradley | G06T 1/0028 713/176 |
| 2005/0063562 | A1 | 3/2005 | Brunk | |
| 2005/0141707 | A1 | 6/2005 | Haitsma | |
| 2005/0259819 | A1 | 11/2005 | Oomen | |
| 2006/0075237 | A1 | 4/2006 | Seo | |
| 2006/0165311 | A1 | 7/2006 | Watson | |
| 2007/0192872 | A1 | 8/2007 | Rhoads | |
| 2007/0253594 | A1 | 11/2007 | Lu | |
| 2010/0150434 | A1 | 6/2010 | Reed | |
| 2010/0322469 | A1 | 12/2010 | Sharma | |
| 2010/0325117 | A1 | 12/2010 | Sharma | |
| 2012/0078989 | A1 | 3/2012 | Sharma | |
| 2014/0142958 | A1 | 5/2014 | Sharma | |
| 2015/0156369 | A1 | 6/2015 | Reed | |
| 2015/0187039 | A1 | 7/2015 | Reed | |
| 2015/0227922 | A1 | 8/2015 | Filler | |
| 2015/0227925 | A1 | 8/2015 | Filler | |
| 2015/0379510 | A1 | 12/2015 | Smith | |
| 2016/0012421 | A1 | 1/2016 | Chitilian | |
| 2016/0098730 | A1 | 4/2016 | Feeney | |
| 2016/0164884 | A1 | 6/2016 | Sriram | |
| 2016/0217547 | A1 * | 7/2016 | Stach | G06T 1/0064 |
| 2016/0335628 | A1 | 11/2016 | Weigold | |
| 2017/0070778 | A1 | 3/2017 | Zerlan | |
| 2017/0076286 | A1 | 3/2017 | Castinado | |
| 2018/0096175 | A1 | 4/2018 | Schmeling | |
| 2018/0121635 | A1 | 5/2018 | Tormasov | |
| 2018/0295172 | A1 * | 10/2018 | Vikramaratne | H04L 65/70 |
| 2019/0305958 | A1 | 10/2019 | Qiu | |
| 2021/0127085 | A1 | 4/2021 | Greaves | |

OTHER PUBLICATIONS

Chapters 1-2 of A. Antonopoulos, Mastering Bitcoin Unlocking Digital Cryptocurrencies, 1st Edition, O'Reilly Media, Dec. 2014, 30 pages.

Chapters 4-5 of A. Antonopoulos, Mastering Bitcoin Unlocking Digital Cryptocurrencies, 1st Edition, O'Reilly Media, Dec. 2014.

Chen et al, 'Efficient Extraction of Robust Image Features on Mobile Devices,' Proc. of the 6th IEEE and ACM Int. Symp. on Mixed and Augmented Reality, 2007. (2 pages).

D. Bhowmik and T. Feng, The Multimedia Blockchain: A Distributed and Tamper-Proof Media Transaction Framework, Proc. IEEE Int'l conf. on Digital Signal Processing, 2017, pp. 1-5.

Fujimora et al., Bright: A Fujimora et al., Bright: A Concept fora Decentralized Rights Management System Based on Blockchain, 2015 IEEE 5th International Conference on Consumer Electronics—Berlin (ICCE-Berlin), Sep. 6-9, 2015, pp. 345-346 (Year: 2015).

Mikolajczyk et al, "Performance Evaluation of Local Descriptors," IEEE Trans. Pattern Anal. Mach. Intell., vol. 27, No. 10, pp. 1615-1630, 2005.

Nakamoto, Satoshi, Bitcoin: A Peer-to-Peer Electronic Cash System, 2009, 9 pages.

Rublee, Vincent Rabaud, Kurt Konolige, Gary Bradski "ORB: an efficient alternative to Sift or Surf", Computer Vision (ICCV), 2011 IEEE International Conference on. IEEE, 2011, 8 pages.

Takacs et al, "Outdoors Augmented Reality on Mobile Phone Using Loxel-Based Visual Feature Organization," ACM Int. Conf. on Multimedia Information Retrieval, Oct. 2008. 8 pages.

* cited by examiner

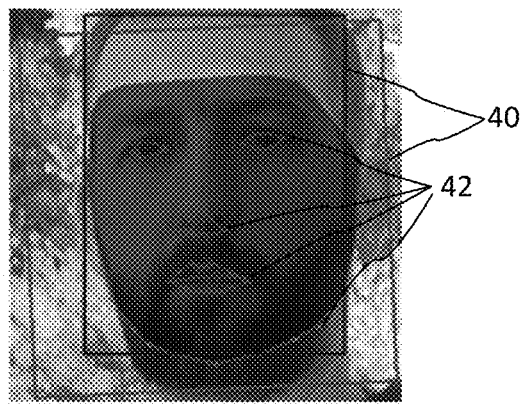
Fig. 3
 
Fig. 4A  Fig. 4B

SYSTEM FOR MITIGATING THE PROBLEM OF DEEPFAKE MEDIA CONTENT USING WATERMARKING

RELATED APPLICATION DATA

This application is a continuation of U.S. patent application Ser. No. 17/150,937, filed Jan. 15, 2021 (U.S. Pat. No. 11,922,532), which claims the benefit of Provisional Application No. 62/961,657, filed Jan. 15, 2020. Each of these patent documents is hereby incorporated by reference in its entirety.

TECHNICAL FIELD

This application relates to image and audio signal processing to detect alteration of and authenticate audio-visual content.

BACKGROUND AND SUMMARY

Concerns about the authenticity of news media content (text, audio, and video) distributed over the Internet have reached an all-time high. In the past, people trusted news that came from reputable newspapers and trustworthy Radio/TV stations, but nowadays they cannot always trust news distributed on the Internet. The Internet has enabled a non-linear media distribution model that does not guarantee the authenticity of the news. Internet users can digitally alter news of authentic sources and re-distribute them through social media networks (e.g. YouTube, Facebook, Twitter, etc.) as if they were originals coming from legitimate sources. Usually, the alteration is done in three different ways. The first is known as face-swap, in which the original face in the video is replaced with another face. The second is known as lip-sync, in which the speaker's voice is replaced by the voice of an impersonator. The third type is known as puppet-master, in which the person in the video is animated to do a desired action.

The news authenticity problem is exacerbated with the advent of deep learning technology. New powerful video creation software tools have recently been developed using deep learning and made available on the Internet for free. These tools are based on the Generative Adversarial Networks (GAN). See, I. J. Goodfellow, J. Pouget-Abadie, M. Mirza, B. Xu, D. Warde-Farley, S. Ozair, A. Courville and Y. Bengio, "Generative Adversarial Nets," in Proceedings of the International Conference on Neural Information Processing Systems (NIPS), 2014.

These tools made the talents and the expensive software and hardware, usually used in the movie industry, no longer required for video content altering. They run on an ordinary personal computer (e.g., a PC), and their use is straightforward. A novice user can use them to quickly alter the looks, the speech, or the actions of the people filmed in any video and generate fake videos that look convincingly real. The generated fake videos are commonly known as Deepfakes and their pervasiveness on the Internet has doubled in the nine months period from December 2018 to July 2019, according to Deeptrace, The State of Deepfakes, Landscape, Threats, And Impact, September 2019, published online by Deeptrace Labs at Deeptracelabs.com.

This rapid increase in number of Deepfakes is alarming and their use could be detrimental to society. They have been used extensively for pornography and, to a much lesser extent, for cyberbullying celebrities, mocking renowned politicians, and robbing financial institutions. Moreover, there is a growing concern that their harmful use could substantially increase. They could be used to spread fake news to influence elections and undermine democracy. They could be used to launch misinformation attacks that could threaten national security. Their malicious use could ultimately lead the public to lose their confidence in what is real. Therefore, there is a multi-faceted interest in detecting and preventing the proliferation of ill-intentioned and malicious Deepfakes, especially video clips of fake news.

Current laws and policies are not adequate to contain the problem of Deepfakes. See, D. Harris, "Deepfakes: False Pornography is Here and Low Cannot Protect You," Duke Law & Technology Review, vol. 17, no. 1, pp. 99-128, 2018; and Chen, "Three Threats Posed by Deepfakes That Technology Won't Solve," October 2019. Available at MIT Technology Review at technologyreview.com.

The existing information privacy laws, the defamation laws and the Digital Millennium Act (DMCA) have recently proved to be insufficient in dealing with the Deepfakes problem. Therefore, the US Congress and many states are introducing new legislation and policies to criminalize malicious Deepfakes. Also, governmental agencies are defining procedures for reporting misuse of Deepfakes, and they are also making these procedures obvious and accessible. Moreover, non-profit organizations are running national campaigns to educate the public on how to deal with the danger of Deepfakes. These legislative actions and educational efforts will help fight Deepfakes, but they are not adequate by themselves. Therefore, it is imperative to develop an advanced technical solution that would detect and prevent Deepfakes from penetrating the social media networks.

Researchers have been investigating developing automatic detectors that detect Deepfakes from the tell-tale signs of alteration. They designed algorithms based on: unusual image artifacts (See, e.g., F. Matern, C. Riess and M. Stamminger, "Exploiting Visual Artifacts to Expose Deepfakes and Face Manipulations," in Proceedings of the IEEE Winter Applications of Computer Vision Workshops (WACVW), Waikoloa Village, HI, USA, USA, 2019.); and inconsistent image statistics, geometry, or semantics.

Koopman and et al. investigated the difference between the Photo Response Non-Uniformity (PRNU) of authentic videos and that of Deepfake videos. M. Koopman, A. M. Rodriguez and Z. Geradts, "Detection of Deepfake Video Manipulation," in Proceedings of the 20th Irish Machine Vision and Image Processing conference (IMVIP), 2018.

Yang and et al. used a Support Vector Machines classifier (SVM) to exploit the inconsistency in head poses. X. Yang, Y. Li and S. Lyu, "Exposing Deep Fakes Using Inconsistent Head Poses," in Proceedings of the IEEE International Conference on Acoustics, Speech and Signal Processing (ICASSP), 2019.

Li and Lyu used convolutional neural networks (CNNs) to exploit face-warping artifacts. Y. Li and S. Lyu, "Exposing DeepFake Videos By Detecting Face Warping Artifacts," in Proceedings of Computer Vision and Pattern Recogniton (CVPR), 2019.

Agarwal and Farid used an SVM classifier to exploit inconsistency in facial expression and movement. S. Agarwal and H. Farid, "Protecting World Leaders Against Deep Fakes," in Proceedings of the Computer Vision and Pattern Recognition Conference (CVPR), 2019.

Li and et al. used a Long-term Recurrent Convolutional Networks (LRCN) to exploite blinking patterns. Y. Li, M.-C. Chang and S. Lyu, "In Ictu Oculi: Exposing AI Created Fake Videos by Detecting Eye Blinking," in Proceedings of the IEEE International Workshop on Information Forensics and Security (WIFS), 2018.

Guera and Delp used a Recurrent Neural Network (RNN) to exploit frame-level features extracted using a CNN. D. Guera and E. J. Delp, "Deepfake Video Detection Using Recurrent Neural Networks," in Proceedings of the IEEE International Conference on Advanced Video and Signal-based Surveillance (AVSS), 2018.

These techniques showed success, but as Deepfake generation algorithms improve, alteration tell-tale signs will gradually disappear, and the developed detection techniques will become less effective.

Researchers are also investigating active techniques that could be used to protect images of celebrities, famous politicians, or ordinary people from being used as targets for Deepfakes. See, S. Lyu, "Detecting Deepfakes: Look Closely to Protect Against Them," July 2019. Available at Salon.com. They are proposing embedding invisible noise in these images as the user posts them to the social media network. This noise is carefully designed to mislead the training process of the GAN network. The noise would cause the training algorithm to misregister the facial features (i.e. eyes, nose, and mouth) and use other image parts instead. This would force the Deepfake algorithm to generate Deepfake images of inferior quality that could be easily detected and hence discarded by the viewer. This research is still in its infancy stage. Therefore, its effectiveness cannot yet be judged.

More effort to support, facilitate, and accelerate the development of advance algorithms for detecting Deepfakes is currently underway. Databases that contain many thousands of Deepfake videos have recently been created by media companies (e.g., Google, Facebook) and made available to researchers. "Deepfakes Datasets," Kaggle, December 2019, Deepfake detection challenge data available at Kaggle.com.

These databases will allow researchers to train, test, and benchmark the Deepfake detection algorithms being developed. Moreover, contests and challenges to incentivize researchers and accelerate development of Deepfake detection algorithms have started under the sponsorships of Facebook/Microsoft (DFDC) and DARPA (SemaFor). "Deepfake Detection Challenge," Available at deepfakedetectionchallenge.ai and ai.facebook.com. See also, D. M. Turek, "Semantic Forensics (SemaFor)," at darpa.mil in the semantic forensics program. These contests are also developing procedures for benchmarking Deepfake algorithms.

Several startup companies such as Truepic, Serelay, and Prover, are providing services to certify the veracity of the media (image or video) upon its capture. Each of these companies provide its subscribers with a special application for capturing the media. This application is designed to automatically send the captured media along with its metadata (capture time, location, and device) to the company's server immediately after capturing. The company, in turn, verifies the integrity of the received media, stores the media or its fingerprint in a blockchain network, and publishes a QR-code or a link to reference the media. This link can be used later by any party interested in checking the authenticity of that media.

This specification describes a system for combating Deepfake audio-visual content comprising audio, video, images or documents. It targets detecting fake content generated from existing authentic content using the processes of face swapping and voice impersonation. Embodiments of the system are implemented with audio and image watermarking from Digimarc Corporation and blockchain technologies which make the system simple, reliable, and efficient.

The disclosed inventions provide system and methods for preparing content for authentication and for authenticating the content. One aspect of the invention is a method for preparing media content for authentication. The method issues a request to add a block in a blockchain for a media content file, and in response, receives a block identifier from the blockchain network. The method forms a watermark payload based on the block identifier of the block and embeds the watermark payload in media content file to produce a watermarked media content file for distribution. This enables the watermark to link the content persistently to authentication metadata in the blockchain as well as storage of the original and watermarked content files, such as in a centralized or distributed storage system.

Several additional means to authenticate the content are enabled. Watermark payloads are embedded in watermarks in segments of audio and video tracks of a video. These segments correspond to consecutive segments of audio and video, such as a sequence of audio and video frame. The creating of fakes either removes or alters the watermarks in the segments, facilitating detection of alteration.

One authentication feature is an interdependency between watermark payloads in the audio and video tracks. For example, one approach to create this interdependency is to form watermarks in the segments from common data related to the segments, such as a video identifier derived from the block identifier.

Another authentication feature is formation of watermarks in audio and video segment sequences. This enables frame removal, alteration or repetition to be detected based on alteration of the sequence of segment identifiers embedded in watermarks of the segments. For example, the segment identifiers comprise a number indicating an order of the sequence of media content segments.

Another authentication feature is to form watermarks in the segments based on robust hashes of content in the segments.

Another authentication feature is to store the media content in a distributed storage system. This enables the authentic content to be stored efficiently and reliably, and retrieved for authentication operations. The index of the media content is a content identifier formed from hashes of the content and is stored as metadata in the blockchain. Since the act of watermarking the content itself alters the content and the hashes that index it, there is a need to manage the original and watermarked content files and associated content identifiers. The distributed storage system divides the media content file into a plurality of chunks, hashes the chunks to provide hashes that index the chunks in memory of the distributed storage system, and stores the chunks on different servers in the distributed storage system. The distributed storage system provides a hash table storing hashes that the distributed storage system uses as indexes to retrieve the chunks from the different servers. It provides a root hash that is used to form the content identifier.

Another aspect of the invention is method of managing the content identifiers for the original and watermarked content. This method manages the content identifier in a mutable link manager system. The content identifier recorded in the blockchain prior to watermark embedding references the watermark media content file through the link manager.

Additional aspects of the invention include methods for authenticating media content using these authentication features. One method authenticates the content in stages, starting with detecting the presence of valid watermarks in the segments, and then checking consistency between watermarks in content tracks, and finally checking the order of segment identifiers. Additional features include making the watermarks dependent on features of the content segments to combat attempts to copy watermarks and insert them in fake content.

Additional features will become apparent with reference to the following detailed description and accompanying drawings.

BRIEF DESCRIPTION OF THE DRAWINGS

FIG. 3 is an image of content in a video, along with features used to authenticate the content.

FIG. 4A is an image of an original frame and FIG. 4B is an image of the same frame after altering it to create a fake.

DETAILED DESCRIPTION

This disclosure describes a system, employing watermarking technology, that detects fake content generated from existing authentic video clips. Embodiments of the system detect fake content generated from authentic content via face-swap and lip-sync.

Figure 1:
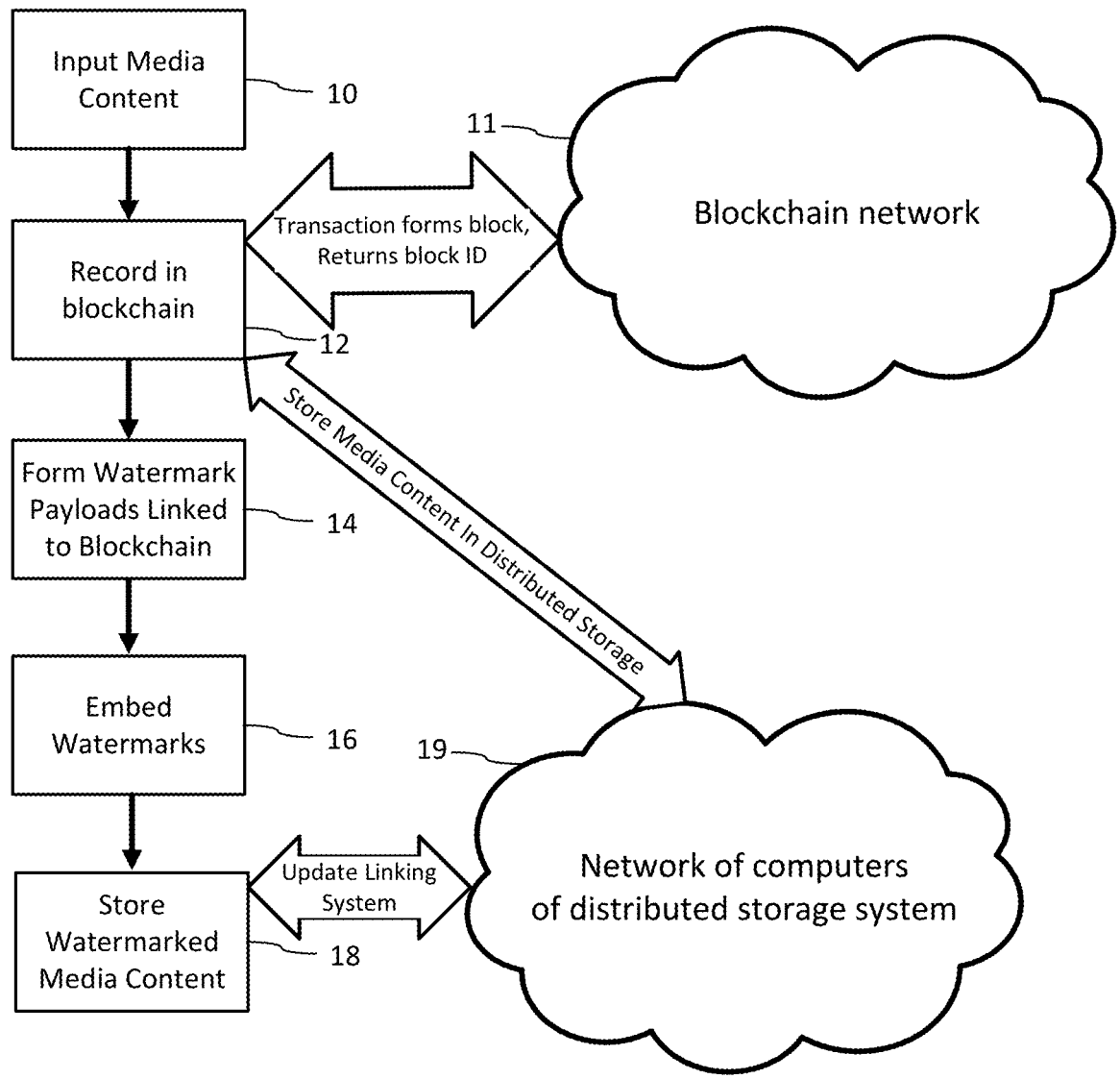
FIG. 1 is a diagram illustrating a process for preparing media content for authentication.

FIG. 1 is a diagram illustrating processing flow in the system to prepare media content for authentication. The system embeds unique digital watermarks in content during video capturing or before video distribution. Prior to embedding watermarks, the system ingests the media content (10). The system can automatically serialize and embed the watermark at the time of streaming or downloading of the video by a recipient. This is accomplished by embedding a watermark carrying a serial number uniquely associated with that instance of the video. The serialization has the extra benefit of enabling tracking distribution of copies or derivative works of content. The embedded watermarks are used to check that news videos, coming from random Internet sources or appearing at the portals of social media networks, have not been altered. The watermarks are also used at the back end of the social media networks to perform forensic analysis of suspected videos to be Deepfakes.

The system also records the history and provenance of content in a blockchain (11) to provide helpful inputs to the forensics process. In one embodiment, the process records a block in a blockchain network, which provides a block identifier that is used to link the media content to that block in the blockchain (12). In particular, the process forms part of a watermark payload from this block identifier (14) and then embeds watermarks comprising this payload into the media content (16). The watermark establishes a permanent link between the content and its blockchain.

In some embodiments, the media content and the watermarked media content are stored (see processing at blocks 12 and 18). This enables the media content to be archived in a network storage system and accessed from network storage for further use and authentication operations. For example, the original or watermarked media content is retrieved from storage to compare with a suspected fake version of it, detect alternations between them, and indicate whether and where the content has been altered.

An advantageous way to store the media content is to store it in a distributed storage system (19) in which chunks of the media content are hashed into hashes which then form a hash tree. The hashes provide an index to memory locations of the content chunks in storage and enable the system to retrieve the chunks from the memory locations and assemble them into a file. When media content files are submitted for storage, the system prepares the chunks and hashes needed to retrieve them and returns a content identifier that is then used to retrieve the file. As shown in FIG. 1 at processing block 12, the original media content file is stored in the distributed storage system, and in response the storage system returns a content identifier used to retrieve it.

This is shown as in FIG. 1 in connection with the process of creating the blockchain record (12) because the content identifier used to retrieve the media content file is stored in the block in the blockchain. When the watermarked video is added to the distributed storage system (18), the content identifier record for the watermarked media content file is associated with the content identifier for the original media content file using a system for managing mutable links. In this mutable link system, the content identifier of the original file is updated with a content identifier of the watermarked media content an update process to the distributed storage system.

Embedding a serialized watermark payload in each copy or derivative work enables each instance of content distribution to be appended in a block of the blockchain. The system enables authorized users to access the original un-watermarked video, create an authorized derivative work, and then watermark and append it to the blockchain.

Figure 2:
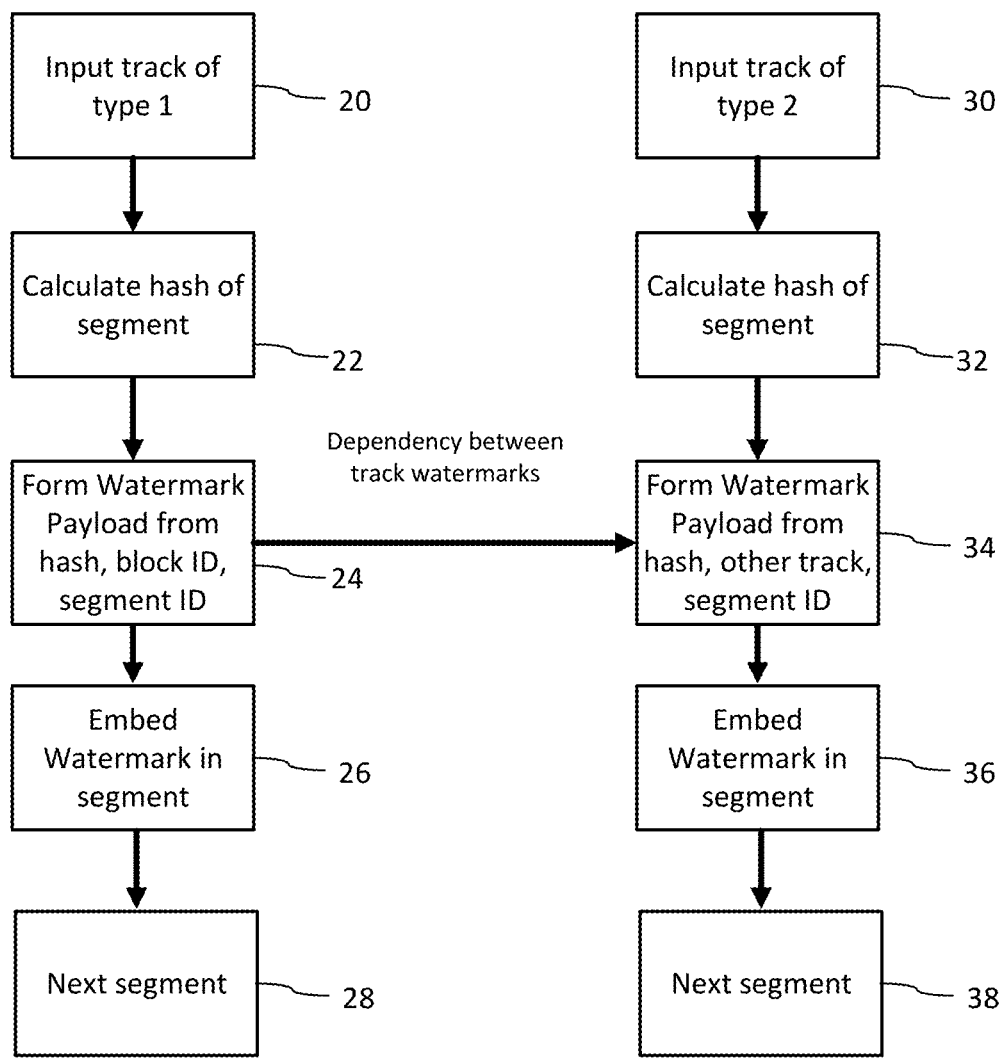
FIG. 2 illustrates a process of embedding watermarks in the tracks in a way that creates inter-dependency between the tracks.

In exemplary embodiments, the watermarks are embedded in the audio and video tracks at fine granularity and specificity to allow reliable detection at an extremely low false positive rate. FIG. 2 illustrates a process of embedding watermarks in the tracks in a way that creates inter-dependency between the tracks. For a first track of audio-visual content (e.g., the audio track), the process receives segments of audio (20) and calculates a robust hash of the segment (22). A robust hash is one that is not sensitive to expected and authorized modifications that occur in normal distribution (like formatting or compression), but it will change with changes in human perceptible features that alter the integrity of the content. Example embodiments are described further below. Next, the process forms a watermark payload for the segment from the hash, block ID and segment ID. The block ID provides an identifier of the media content file and ties it to is block in the blockchain. For example, in one embodiment, the block ID from the blockchain is used to create a video identifier (VID). The process then generates a watermark signal from the payload and embeds it into the segment (26). The process then repeats with the next segment until the entire track is processed in a similar way.

Likewise, the process receives segments of track of type 2 (e.g., video) (30) and executes a similar set of steps to embed a related payload in the track. It calculates a robust hash of the segment (32). Then, it forms the watermark payload from the hash of the segment, the payload of the other track, and a segment ID for the segment.

The embedded marks are robust to common video manipulations, such as D/A and A/D conversion, filtering and compression, but they are sensitive to changes that target the video integrity. They impart unique identities to the host video linking the video to its source and provenance in a blockchain network. The watermarks allow comparing the video with its original copy at the source to establish its authenticity. The video and audio watermarks are tightly coupled, and they cross reference each other to verify the integrity of the video. This coupling allows these watermarks to verify that an audio segment has not been replaced as is often done in making Deepfakes via voice impersonation. A frame watermark can localize frame changes resulting from face swapping, which is commonly used for making Deepfakes.

Once the video is watermarked, the content provider can provide its users with a software application to view and authenticate videos coming from random sources. This software application may be downloaded and executed on a user's computer, or executed in a server (e.g., via cloud service). In one embodiment, the software automatically attempts to detect and decode the watermarks if they exist, while the user watches the video. The software performs an integrity and consistency check between the video and audio watermarks and determines authenticity according to a specific integrity criterion. It then outputs an indicator of authentication, or not, to the user. In one embodiment, a green light is used to indicate authentic videos, a red light is used to indicate fake videos that do not satisfy the integrity criterion, and an amber light is used to indicate unwatermarked videos. The user may also interrogate the software to determine and localize the changes introduced in the video. In this case, the software performs a forensic analysis and compares the video-under-test with the original video stored in a publicly accessible distributed blockchain network to determine the altered or missing content. This allows the viewers to identify and discard any Deepfake news video clips and distrust its source.

The detection software can also be integrated with popular media players to enable them to check the watermarks and report authenticity to the viewer as the dedicated player software does. The watermark detector software can also be used at the portals of social media networks to prevent doctored videos from spreading widely. It can also be integrated with the back end of content hosting and sharing networks, including social media networks, to perform forensic analysis of the suspected video to determine whether the video should be taken down or not.

Digital Watermarks

The system described in this paper employs two kinds of robust watermarking technologies to identify and authenticate the video. The first is an audio watermark, and the other one is an image watermark, available from Digimarc Corporation. Both marks are used in a tightly coupled way to provide extended payload capacity, unique content identification, and an adequate level of security. Only authorized entities (e.g., news agencies) have access to the watermark embedder. Also, a secure watermark reader employs detection protocol known only to an authorized party, such as a content owner and his delegates.

Audio Watermark

The audio watermarking technology is used to protect the audio component from alteration or separation from the original video. For an exemplary embodiments of this audio watermark technology, see: R. K. Sharma, B. A. Bradley, S. T. Shivappa, A. Kamath and D. A. Cushman, "Audio Watermark Encoding With Reversing Polarity and Pairwise Embedding". U.S. Pat. No. 9,305,559, 5 Apr. 2016, which is hereby incorporated by reference.

For this application, an audio watermark encoder embeds an imperceptible spread spectrum signal (e.g., in the 120 Hz to 8 kHz range) into the magnitude of the frequency coefficients of each channel of the host audio. The host audio is typically sampled at 44.1 kHz or 48 kHz. The encoder generates watermarked audio by first processing the host audio as frames of 2048 consecutive samples at 16 kHz sampling rate. A spread spectrum watermark is embedded in the frequency representation of each of these frames. A different payload is embedded in every one second of audio using an extensible payload protocol that enables the deployment of different watermark versions. The fine granularity of the watermark allows the system to detect fine alteration of the audio track.

For an exemplary embodiment, the watermark signal is a concatenation of 12 bits for version control, 24 bits for error detection code (e.g., Cyclic Redundancy Check (CRC)), and 24 bits for variable payload. Furthermore, the error detection code and variable payload bits are encoded using convolutional and repetition encoding to protect them from channel errors. Repetition only is used to protect the version bits from error. A unique pseudo-random sequence (PN) is also used to scatter the resulting sequence of bits to make them look like noise. The scattering process makes the watermark imperceptible and provides additional protection against erasure error. The PN sequence also serves as a security key that can be chosen uniquely per user or per application to provide serialization. Finally, the resulting bit-sequence is scaled and shaped according to a psychoacoustic model to provide masking during audio playback. The result is a watermark signal of 2048 samples ready for embedding in the host audio channel.

To embed the resulting watermark signal in the host audio, the host audio frame is transformed to the frequency domain using the Fourier transform and the watermark is added to the magnitudes of the Fourier coefficients. The sign of the watermark is reversed in every other frame. The bit reversal allows the detector to reduce the effect of the host audio by subtracting every two consecutive frames from each other before decoding. This subtraction cancels the host signal and reinforces the watermark signal which enhances the signal to noise ratio. Finally, the embedded frequency coefficients (magnitudes and phases) are transformed to the time domain using the inverse Fourier transform to generate the embedded audio. Several variants are possible. For example, the watermark may be adapted based on frequency and time domain perceptual modeling, and then inserted into the audio signal in the time or frequency domain. For example, see A. R. Gurijala, S. T. Shivappa, R. K. Sharma and B. A. Bradley, "Human auditory system modeling with masking energy adaptation". U.S. patent Ser. No. 10/043, 527, 7 Aug. 2018, which is hereby incorporated by reference.

Real time, low latency encoding may be employed to enable transactional watermarking at the time of transmission of the video. Low latency encoding is described in more detail in the following: J. D. Lord, "Watermarking and Signal Recognition For Managing and Sharing Captured Content, Metadata Discovery and Related Arrangements". U.S. Pat. No. 9,454,789, 29 Nov. 2018, which is hereby incorporated by reference.

Detection of the audio watermark is performed at 16 kHz sampling rate using one second of audio. Frame accumulation with sign reversal every other frame is first performed to boost the signal-to-noise ratio. Synchronization is achieved by correlating the audio with fractional shifts of a watermark frame. The accumulated signal is then transformed to the frequency domain using the Fourier transform. The Fourier magnitudes are calculated and correlated with the PN spreading sequence to obtain the encoded payload sequence. The version bits are first decoded from the encoded payload sequence. Then the Viterbi convolution decoding is performed to correct for any errors and the CRC bits are recalculated to verify the presence of the watermark. Finally, the payload bits are decoded.

The audio watermark can be detected in as little as one second of audio, but longer duration is needed for increased reliability. The watermark is robust to noise, compression, D/A and A/D conversion, and the broadcast/streaming environments. It can also be detected in the presence of linear time scaling and pitch invariant time scaling.

Video Watermark

The image watermarking technology is used to protect the video frames from alteration. It is embedded into the frames of the video clips in either the uncompressed or compressed domain (e.g. MPEG4). For exemplary implementations, see: A. M. Alattar, E. T. Lin and M. U. Celik, "Digital Watermarking of Low Bit-Rate Advanced Simple Profile MPEG-4 Compressed Video," IEEE Transactions on Circuits and Systems for Video Technology, vol. 12, no. 8, pp. 787-800, August 2003, and A. M. Alattar, E. T. Lin and M. U. Celik, "Digital Watermarking of Low Bit Rate Video". U.S. Pat. No. 8,638,978, 28 Jan. 2014, which are hereby incorporated by reference. For additional teachings on how to embed and read watermarks in electronic and physical objects of various kinds, please also see U.S. Pat. No. 6,614,914, which is also hereby incorporated by reference.

The watermark consists of a synchronization signal and a payload signal. The synchronization signal is embedded in the frequency domain and the payload signal is embedded in the spatial domain. The two signals are added together according to a predetermined ratio to form a 128×128 tile. This tile is embedded into each video frame by simple addition and tiled to cover the entire frame. Before addition, the strength of the tile is adjusted according to the local characteristics of the frame and the overall desired robustness level. Also, the tile could be up-sampled to a different size, to make it better suited to the deployment environment. Different frames carry different payloads to allow the detection of frame insertion, deletion, and shuffling.

The synchronization signal is a constellation of frequency peaks of the same magnitudes and random phases. These frequency peaks form a pattern in the frequency domain and are used to guide the detector in reading the watermark. The watermark reader uses this frequency pattern to reverse the affine transformation that results from video manipulations such as rotation, scaling and cropping. The payload protocol is extensible and has similar structure to that of the audio watermark. For this exemplary embodiment, the payload signal consists of 79 bits composed of 4 bits for version control, 24 bits for CRC, and 47 bits for the variable payload. The version bits are protected from error using convolutional encoding and repetition while the CRC and payload bits are protected against channel error using only convolutional encoding. Each bit of the resulting sequence is also spread and scattered 16 times within a 128×128 tile using a unique PN sequence. As in the audio watermark, these PN sequences can be chosen uniquely per user or per application to provide serialization.

The watermark can be independently detected and read from each 128×128 block in each frame of the video. First a non-linear filter is used to separate the watermark from the host frame. Then, the presence of the synchronization signal is detected in the frequency domain using a match filter or least square fitting. Then the block's scale, rotation angle, and translation parameters are estimated. These parameters are used to properly align the frame block for reading the payload signal. The payload bits are extracted from the aligned block and the scattering and spreading process is reversed. The version bits are then decoded, and the repeated bits are accumulated to enhance the signal to noise ratio. Then the Viterbi decoding is applied to obtain the variable and CRC bits. The CRC bits are recalculated and compared to the decoded CRC bits. Correct CRC bits indicate successful reading of valid variable payload bits.

Blockchains

The system uses blockchains to store all the information needed for performing forensic analysis on a suspected news video clip. This information includes copies of all published editions of a video clip and their relevant metadata. See, for background, C. Atkinson, "What Are The Types of Metadata Online Video Creators Can Use?," June 2012. Available at Tubularinsights.com. For further implementation support, see T. F. Rodriguez and M. M. Weaver, "Robust Encoding of Machine Readable Information in Host Objects and Biometrics, and Associated Decoding and Authentication". U.S. Pat. No. 10,594,689, filed 4 Dec. 2016, which is hereby incorporated by reference.

Metadata includes information that is created by the capture hardware or editing software (e.g. file name, file type, GPS coordinate, camera settings, time stamp, duration, ownership, etc.). It also includes human generated information that describe the video (e.g. keywords, tags, and comments). It could also include information generated automatically by speech and image recognition software (e.g. video transcripts, shots' boundaries and descriptions, Scale-Invariant Feature Transform (SIFT) key points, video and audio fingerprints, cryptographic hash, etc.). SIFT features are described in D. G. Lowe, "Distinctive Image Features from Scale-Invariant Keypoints," International Journal of Computer Vision, vol. 60, no. 2, p. 91-110, 2004.

Different types of blockchain systems are used for storing the videos and their metadata. The metadata can be retrieved based on the watermark embedded in the video.

A blockchain is a distributed, transparent, and publicly verifiable ledger composed of a series of immutable blocks of data records that are replicated and stored in a network of distributed computers. Each of these blocks contains one or more transaction records and a cryptographic hash. This hash is calculated from the data in the previous block including the hash of its predecessor block. These hashes make the blocks in the chain practically immutable. Any change made to an existing block would require recalculating and changing the hashes in all subsequent blocks in all the computers of the network (nodes). This recalculation is practically impossible, especially in a large network of many computers storing large number of blocks. The nodes in a blockchain network are used to record transactions in blocks, store these blocks, verify transactions, and manage the overall ledger.

The blockchain network can be decentralized or centralized. Decentralized networks allow anonymous users to participate and transact on the ledger. The Proof-of-Work (PoW)/mining mechanism is used to maintain the integrity of the ledger and prevent malicious users from corrupting the system. On the other hand, centralized networks allow only credible participants (authorities) to transact on the ledger. The identities of these participants are known, and their transactions can be audited at any time. The authentication mechanism used by these centralized networks is known as Proof-of-authority (PoA). Compared to PoW, PoA networks are more secured, less computationally intensive, more performant, and more predictable. Therefore, the centralized blockchain networks are more appropriate for use in our system than the decentralized blockchain networks, but decentralized blockchain networks may also be used.

Blockchains are inherently not suitable for storing a large amount of data such as video data. Because blockchains replicate the ledger on each of their nodes, storing video databases on them requires extremely expensive storage hardware. Moreover, most blockchains impose limits on their block size and rate of appending blocks to the network. The block size limit protects the network from the double spending problem, and the block rate limit makes the PoW mechanism effective. Bitcoin limits the block size to one Mega Byte and the block rate to one block every ten minutes. On the other hand, an Ethereum network has no limit on the block size in the blockchain, and it has an increased block rate of one block every fifteen seconds. Changing the block size and block rate is tricky, and if not done carefully, it can affect the security of the blockchain. For more on this point, please see: A. Gervais, G. O. Karame, K. Wüst, V. Glykantzis, H. Ritzdorf and S. Capkun, "On the Security and Performance of Proof of Work Blockchains," in CCS 2016—Proceedings of the 2016 ACM SIGSAC Conference on Computer and Communications Security, Vienna, Austria, October 2016.

To avoid the aforementioned problems, our system does not store the video data in an ordinary blockchain. Our system stores the video data in a Distributed Storage Platform (DSP). The Inter-Planetary File System (IPFS), Swarm, Sia, Storj, or MaidSafe are popular examples of DSP. These platforms are effective peer-to-peer systems that store their data in a distributed, safe, robust, and decentralized manner without duplication. They are based on the Ethereum blockchain technology, which is used to incentivize participants to pool their resources (i.e. storage and bandwidth) and provide them to all participants of the network in exchange of monetary compensation. A DSP, from a developer point of view, is similar to the World-Wide-Web, except that the uploads are not hosted on a specific server. Instead, chunks of the uploaded file are hashed and stored on different servers.

A Distributed Hash Table (DHT) is used internally to retrieve the data chunks from these servers. A distributed hash table is a distributed system of computers, called nodes, that provides a lookup service similar to a hash table: key-value pairs are stored in a DHT, and any participating node can efficiently retrieve the value associated with a given key. Nodes can be added to or removed from the distributed system of computers with minimum work around re-distributing keys. Keys are unique identifiers which map to particular values, which in turn can be anything from addresses, to documents, to arbitrary data (such as chunks (also called blocks) of the file or files). Responsibility for maintaining the mapping from keys to values is distributed among the nodes, in such a way that a change in the set of participants causes a minimal amount of disruption. This allows a DHT to scale to extremely large numbers of nodes and to handle continual node arrivals, departures, and failures.

A root hash, in machine and human readable format that serves as a Content Identifier Number (CID), is used externally to identify and retrieve the entire file. The root hash is the root of a hash tree. A hash tree (e.g., a Merkle tree) is a tree in which every leaf node is labelled with the cryptographic hash of a data block, and every non-leaf node is labelled with the cryptographic hash of the labels of its child nodes.

In one embodiment, a DSP tracks changes to its files using a separate blockchain network, which allows the users of our system to retrieve the change history and provenance of the video file using the same hash.

Unlike video data, the metadata of the video is stored in a private centralized PoA-based Ethereum blockchain network in the form of transaction data or a smart contract. This network is fast and economical. It contains a limited set of nodes; each of which is controlled exclusively by an authentic content producer, such as a news publisher. These publishers are the only users who can transact to the network. Other users can only retrieve and view the information already written to the blockchain. The standalone watermark readers or the readers integrated within the media players or the networks' back end forensic tools are technically users of the blockchain network with only read access-rights. Each block in the blockchain is restricted to contain only one transaction and each transaction is restricted to be related to only one video. These limits on the blocks and their transactions provides a one-to-one correspondence between the Video Identification Number (VIN) and the block number in the blockchain.

The VIN is included in the video watermark and is used for any forensic analysis performed on a suspected video. After decoding the payload from the watermark, the VIN can be used as an address to retrieve the CID and the metadata of the video from the centralized blockchain network. Since the blockchain is accessible by the public, this operation can be performed by any user with the proper watermark reader. The retrieved CID can then be used to retrieve the video from the IPFS. The suspected video can be viewed and compared manually to the retrieved video to determine its authenticity. The comparison can also be done automatically using an algorithm designed for this purpose. The retrieved metadata provides additional information that helps the forensic process. History and provenance information of the video can be provided by storing the information in a smart contract rather than transaction data. See, for example, H. R. Hasan and K. Salah, "Combating Deepfake Videos Using Blockchain and Smart Contracts," IEEE Access, vol. 7, 2019.

A traditional centralized database could be used instead of a blockchain for storing the video and its forensic information, however, using a blockchain is preferred. Blockchains eliminate the need for an expensive database administrator, who can be trusted by all participants. They provide invaluable protection for the data by maintaining its integrity and decentralizing its storage in a highly fault-tolerant network. They create an absolute trust in the stored data, that is necessary for facilitating collaborations and enabling partnership among business associates and competitors. They store the data in immutable, transparent, and secure blocks, and they do not allow changing the data recursively. They track changes and record history of the recorded data to provide an audit trail that enables forensic analysis. Centralized databases lack these advantages; therefore, using a centralized database instead of a blockchain should only be considered an interim step in the process of implementing the proposed system, and migration to a blockchain should be the ultimate goal.

Copy Attack

The "Copy Attack" allows a user to estimate and extract a watermark from one video and insert it into another. This attack is explained in this paper: M. Kutter, S. Voloshynovskiy and A. Herrigela, "The Watermark Copy Attack," in Proceedings of SPIE: Security and Watermarking of Multimedia Content II, San Jose, CA, USA, January 2000.

An adversary could generate a Deepfake video based on an authentic video clip then add authenticity to it by copying a watermark from another authentic watermarked video. For puppet-master Deepfakes, the watermark needs to be copied everywhere, but for face-swap Deepfakes, only the watermark on the original face region, which was replaced, needs to be copied to the new face region. Similarly, for lip-sync Deepfakes, only the watermark from the original audio segments, that were replaced, needs to be copied to the new audio segments. Consistent watermark synchronization should be preserved when the watermark from a video frame region or an audio segment is copied.

The system needs to defeat the copy attack by employing video features that would be altered by swapping in new content, like a face or an audio segment. For details on such a method, see, J. K. Barr, B. A. Bradley, B. T. Hannigan, A. M. Alattar and R. Durst, "Layered Security in Digital Watermarking". U.S. Pat. No. 8,190,901, 29 May 2012, which is hereby incorporated by reference.

A robust hash derived from the video can be used for this purpose. A hacker can blindly copy the watermark from one area into another area of a frame, but he has no way to check whether these features have been altered by the copy operation. The hash can be stored as metadata in the blockchain or included in the payload of the watermark. Making the watermark content dependent is a convenient solution, but it is not necessary for defeating the copy attack when there is access to content features in the blockchain for authenticating the video. A content dependent watermark allows video verification when access to the blockchain is not available. Therefore, we propose to include a hash of some video features in the payload. All other metadata stored in the blockchain can be used for video verification whenever access to the network is available.

The payload of the image watermark is designed to include a robust Video Frame Hash (VFH) calculated from the locations of the most prominent and robust features in a video frame. The locations of the center of the eyes, tip of the nose, and the left and right corners of the mouth can be used with portrait images. Relatedly, see, A. Alattar, "Authentication of Physical and Electronic Media Objects Using Digital Watermarks". U.S. Pat. No. 7,822,225, 26 Oct. 2019, which is hereby incorporated by reference. Also, the areas within the boundaries of these features could be used.

The MTCNN (Cascaded Convolutional Neural Networks) algorithm is used for calculating these locations. K. Zhan, Z. Zhang, Z. Li and Y. Qiao, "Joint Face Detection and Alignment Using Multi-task Cascaded Convolutional Networks," IEEE Signal Processing Letters (SPL), vol. 23, no. 10, pp. 1499-1503, 2016.

The payload of the audio watermark is also designed to include a robust Audio Segment Hash (ASH) calculated from the lowest quantized Mel Frequency Cepstrum Coefficients (MFCC) of the audio frame. Related background on audio features are described in the paper: P. Cano, E. Batlle, H. Mayer and H. Neuschmied, "Robust Sound Modeling for Song Detection in Broadcast Audio," in Proceedings of the 112th AES Convention, 2002.

After the watermarks are decoded, the detector software recalculates these hashes and compares them with those values extracted from the payload or retrieved from the blockchain. A no-match condition would indicate a copy attack and invalidate the watermarks, hence the news video.

Results and Analysis

This section further describes exemplary embodiments of a system.

IPFS for Storing Video Data

To store the video data in a distributed storage platform, we used the Inter-Planetary File System. "IPFS powers the Distributed Web," Available: at doc.iofs.io/.

We selected IPFS because it is public and designed specifically for storing digital assets (i.e. text, audio, and video). However, at the time of the initial filing, IPFS is still a prototype subject to change, and its participating nodes are volunteers. Therefore, storing the data in the IPFS carries the risk of losing the data if a node decides to stop participating in the network. Also, users will start paying a very reasonable charge for storing their video once the system is finalized. The IPFS system divides the file into chunks called blocks and stores them into a set of distributed nodes without duplication. This considerably reduces the storage requirement and its associated cost. We stored a sample video in the IPFS and obtained a Content Identifier (CID). The IPFS generated the CID from the video content itself. The IPFS calculates the CID from a Merkle-Distributed Acyclic Graph (DAG) tree representing the hashes of the chunks of the video. Although calculated differently, the CID is a 256-bit multi-hash similar to the popular SHA2-256. The CID can be used to reference the video and to authenticate any digital copy of it.

Rinkeby Blockchain for Storing Metadata

To store the metadata of the video in a blockchain, we used the popular Rinkeby testnet. Other networks such as the Ropsten and Kovan testnets or the Ethereum mainnet could also be used. Rinkeby as well as Kovan are based on PoA, but the Ropsten and Ethereum are based on PoW. The data can be stored in these networks as either smart contract or transaction data. For simplicity, we stored the data as transaction data in Rinkeby network, but reference by Hasan and Salah cited above describes how to store the data as a smart contract in an Ethereum network. We used the MetaMask digital wallet for submitting transactions to the Rinkeby network. We used an older version (3.13.8) of MetaMask because the interface of the version (7.7.1) does not have a field for entering the transaction data. We obtained the needed currency (Eth) for posting transactions from the Rinkeby Facet.

The transaction data consisted of the CID hash of the video clip and a record of metadata needed for authentication. The exemplary embodiment first converted the transaction data from ASCII format to the required hexadecimal format. It then included the result in a transaction and submitted it to the network. The network queued the submitted transaction with transactions submitted by other participants. Then the network stored these transactions in a block and appended the block to the blockchain. The network assigned an identity number (BID) to the block and a transaction number (TN) to our transaction within the block. The embodiment concatenated the BID and TN and formed the video identification number (VIN). Then the embodiment embedded the VIN in the video watermark.

Because this embodiment added the watermark to the video after storing the file in the IPFS, the CID of the watermarked video would not match its CID in the blockchain. One solution to this problem is to store the CID in the Inter-Planetary Name System (IPNS) and replace the CID in the blockchain with a pointer to the CID location. See, "IPFS powers the Distributed Web," Available at: doc.ipfs.io/.

The IPNS is a system for creating and updating mutable links to IPFS contents. It stores the CID in an encrypted form using a pair of public and private keys. It uses a hash of the public key associated with the record containing the CID as a pointer to CID record. The stored CID is signed by the corresponding private key. After the watermarked video is added to the IPFS, the CID record in the IPNS is replaced with the CID of the watermarked video using an update process to the IPFS. The IPNS cannot keep both CIDs at the same time. To keep the CID of the original video, a JSON bundle that includes the CID of the original video and the CID of the watermarked video is generated first using the IPFS Linked Data (IPLD), and the CID of the bundle is stored in the IPNS instead of the CID of the original video.

The process is as follows:
1. Create a file containing the first version of the content (e.g., original video) and store it on IPFS;
2. Generate an IPFS bundle referencing this file as version 1 (IPLD can store a JSON object on IPFS where leaves can contain data or links.)
   a. The entire bundle can be retrieved by supplying a get command with a pointer to the bundle.
   b. Specific data within the bundle is retrieved with a get command with the CID and an identifier of the desired object in the bundle.
3. Store the IPLD hash on IPNS. This IPLD CID has a content addressable hash like any other object on IPFS and can be stored on IPNS.
4. Create a second version and upload it on IPFS.
5. Create a new bundle with the second version.
6. Publish the new hash of the second bundle.

This method allows the original video as well as the watermarked video to be retrieved during the forensic analysis.

Watermark Payload

In the exemplary embodiment, the payload of the audio watermark is changed for each sequence of audio (e.g., every one second of audio). The watermark carries a payload comprising an audio segment number, audio segment hash, and at least a portion of a Video Identification Number. In an exemplary embodiment, the payload comprises 24 bits of the following information:
1. 5 bits for Audio Segment Number (ASN): ASN is reset every 32 seconds of audio. It is used to detect audio segment deletion, insertions, and reordering. Gaps in the sequence of ASNs indicates missing audio segments, inserted segments do not have watermarks, and out of order ASN sequence indicates audio segments shuffling.
2. 14 bits for Audio Segment Hash (ASH) described above: ASH is used to protect against copy attack. A miss-match between the ASH calculated from an audio segment and the ASH in the watermark embedded in that audio segment indicates a copy attack.
3. 5 least significant bits of the Video Identifier Number (LVIN) described previously: A miss match between these bits and the corresponding bits of the VIN in the frame watermark indicates that the audio does not belong to the same video.

The payload of the image watermark is changed for segments of video (e.g., every frame). It comprises a video segment number (a segment can be a frame or sequence of frames), video frame hash, and Video Identification Number.

An exemplary embodiment of the video watermark payload comprises 47 bits of the following information:
1. 5 bits for Video Frame Number (VFN): VFN is reset every group of 32 consecutive frames. Gaps in the sequence of VFNs indicates missing frames, inserted frames do not have watermarks, and out of order VFN indicates frame shuffling.
2. 22 bits for Video Frame Hash (VFH) described previously: A miss-match between the VFH calculated from the facial features of a video frame and the VFN in the watermark embedded in that frame indicates copy attack.
3. 20 bits for the Video Identifier Number (VIN) described previously: The VIN extracted from the image watermark alone is enough to retrieve the video and its metadata from the blockchain network for forensic purposes.

Deepfakes Generation and Detection

To evaluate the effect of the Deepfake algorithms on Digimarc's image watermark, we embedded ten frames of a head and shoulder video sequence (captured in house) and subjected them to Deepfake creation. We used the open source DeepFaceLab algorithm to replace the faces in these frames with the faces of a target person. We used a 120-frame video of the target person. We first used the TensorFlow-based MTCNN (Multi-task Cascaded Convolutional Neural Networks) algorithm to detect and extract the faces in the original and target videos. Again, see K. Zhan, Z. Zhang, Z. Li and Y. Qiao, "Joint Face Detection and Alignment Using Multi-task Cascaded Convolutional Networks," IEEE Signal Processing Letters (SPL), vol. 23, no. 10, pp. 1499-1503, 2016.

The MTCNN is a three-stage algorithm that detects the bounding boxes (40) of all faces in an image along with the locations of their five landmarks (two eye center, one nose tip, and two mouth corners). We used the Face Alignment Network (FAN) algorithm to refine the area within the bounding box and locate 68 detailed facial landmarks (e.g., coordinates in an image frame identifying locations of eyes, nose, mouth and face (42)) as shown in FIG. 3. For background on a face alignment algorithm, see "Face Recognition," available at: github.com/1adrianb/face-alignment.

These landmarks (42) are later used to re-assemble the fake images. Then we used DeepFaceLab to organize the extracted face images by their yaw angles. See, "DeepFaceLab," available at: github.conm. This organization aligned the faces and simplified the generation of the required Deepfake model.

We trained the DeepFaceLab on the original and target faces using an ordinary Intel Core-7 PC and applied the result to the original frames. The training process to map the target faces to the original faces was very slow (3800 iterations were performed in 26 hours). However, applying the results of the training stage to the original frames was very fast. At the end, a reasonable Deepfake was generated; an example of which is shown in FIG. 4B, which is generated from the original frame in FIG. 4A. A better Deepfake could have been obtained faster using the CUDA programing language running on a modern NVIDIA GPU card, which can run iterations much faster (an order of magnitude faster than a typical PC).

We ran two experiments to create a robust VFH from the frame features to prevent the previously described copy attack. We first tried to use the estimated eyes' centers, nose tip, and mouth corners, but we found these measurements sensitive to minor image manipulations such as image blurring, sharpening, and compression. Therefore, these features are not suitable for calculating a robust hash that can be used to prevent a copy attack. We then used the areas within the estimated boundaries of the eyes, nose and mouths. We quantized these areas with a uniform quantizer with a step size of 20 to allow a 20 square pixel error tolerance. Our preliminary results showed that these measurements are robust to ordinary image manipulations, but they are not robust to the Deepfake process. Therefore, we used them to calculate the desired 22 bits robust hash using a Python built-in hash function and a modulo operation. The Python function implements a simple multiplicative/XOR operations, and the modulo operation was used to limit the hash size to 22 bits. These bits are used as VFH and included in the image payload. They could also be stored in the metadata in the blockchain.

Finally, we used Digimarc's watermark reader on the frames of the resulted Deepfake video. The results showed that the watermark can be detected everywhere in the frames except in the face areas where the faces had been swapped. This means that the Deepfake transformation and the face swapping can be localized using image watermarking, provided that the watermark is not copied to the original frame using a copy attack. If the watermark was copied to the face area, then the exemplary embodiment runs the MTCNN algorithm on the fake images to locate the Facial area and the FAN algorithm to re-generate the 68 detailed landmarks. It also calculates a hash of the areas of the main facial features and compares it to the hash embedded in the watermark. In this case, the comparison would fail; but it would succeed if the video was not fake. Therefore, embedding the hash of video feature is a good counter measure for the copy attack.

Deepfakes Detection and Forensics

The system performs two stages of authentication to detect fake news video clips made from watermarked video clips by audio impersonation or face replacement. The system automatically performs the first stage solely using the embedded watermark and performs the second stage only when access to the metadata in the block chain is available. The second stage can be performed automatically or upon the user's request.

Figure 5:
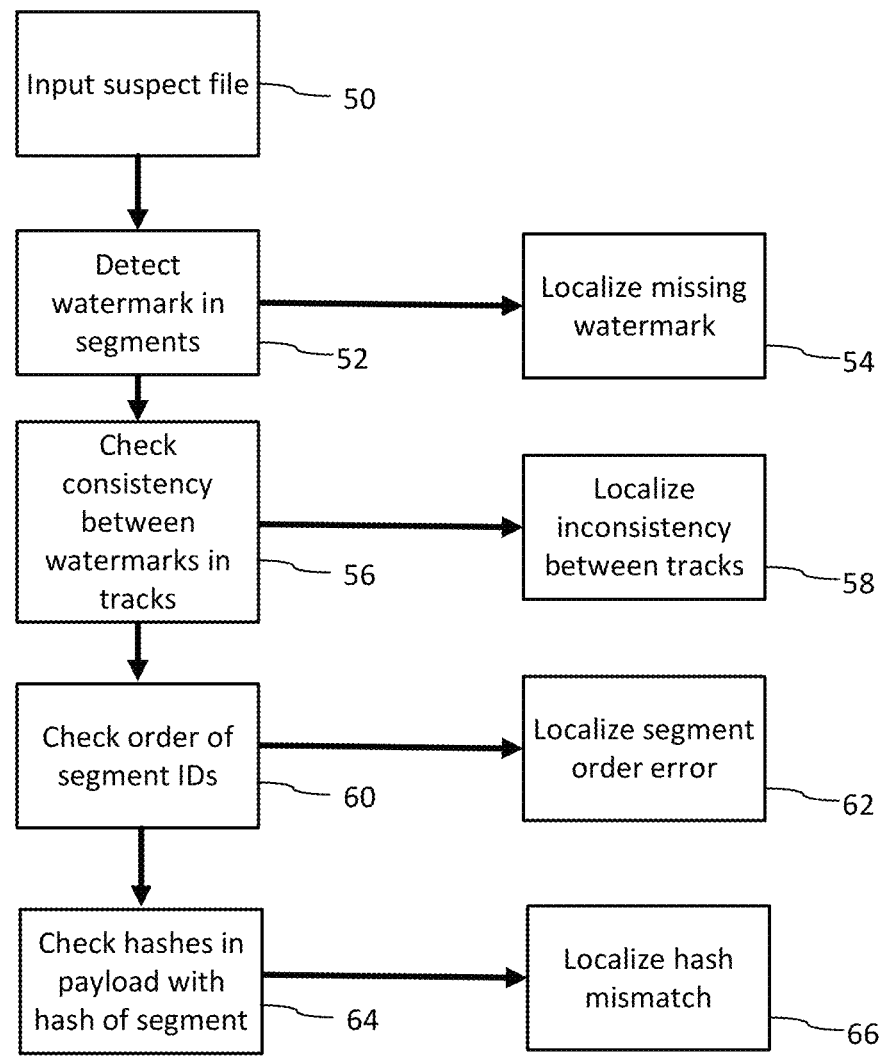
FIG. 5 is a diagram of a process of authenticating and localizing alteration using watermarks.

FIG. 5 is a diagram of a first stage authentication process. The first stage of authentication uses information embedded in the watermark. This stage does not use metadata in the blockchain. The input to the process is a suspect content file (50). The process operates on segments of the audio and video tracks. The system first looks for the watermark using a watermark reader. If both audio and video watermarks are not found in a segment (52), the system reports that authenticity of the video under test cannot be established. If only one of the two watermarks are found, the system reports that the video has been altered, and it also reports the track missing the watermark. If the audio is missing the watermark, the system reports the video as fake made by audio impersonation. The system localizes alteration by returning output indicating location of audio and video segments in which the watermark is not detected (54).

If both audio and video watermarks are found, the system checks the consistency between them to make sure they contain related VID (56). In an exemplary embodiment, only the 5 least significant bits of the VID decoded from the video need to match the LVID decoded from the audio. If they do not, the system reports to the user that the video is fake. The system localizes alteration by returning output indicating locations in the content where the audio and video segments lack consistency (58). These are locations where the interdependency between the payloads is not satisfied. Specifically, the payload portion based on common data, such as the VID portion in this case, does not match.

If the consistency check is successful, then the system checks the order of the segment identifiers (60). In the exemplary embodiment, the system accomplishes this by using the ASN and VFN numbers decoded from the payload to check whether the audio and video segments are consecutive. Audio segments and video frames need to be consecutive without gaps or repetition; otherwise, the system flags the video as fake. The system localizes alteration by returning output indicating locations in the video where the order of audio or video segments are incorrect (62).

If audio segments and video frames are consecutive, the system proceeds to check whether the ASH and VFH hashes decoded from the payload are the same as those measured in the video itself (64). The system returns output indicting whether the hashes are consistent, and if not, also returns output indicating location of segments that have incorrect hashes (66). If the ASHs of an audio segment are different, the system reports that segment was replaced. If the VFHs of a frame are different, the system reports that the face in that frame has been replaced.

Figure 6:
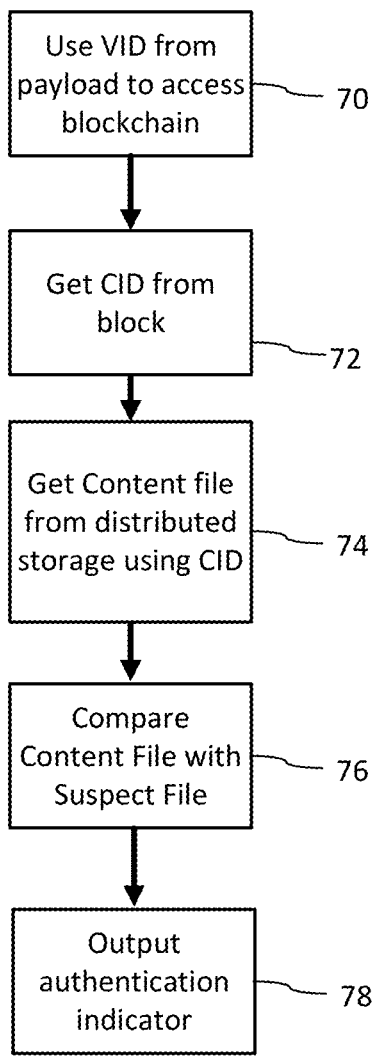
FIG. 6 is a diagram of a process of authenticating and localizing alteration using a watermark and blockchain to access content in distributed storage.

FIG. 6 is a diagram of a second stage authentication process. The second stage of authentication uses information embedded in the watermark and information included in the metadata stored in the blockchains. If access to the blockchain is available, the system can perform forensic analysis using the VID decoded from the image watermark found in the suspect video under test. The system uses the VID as an address to access the blockchain (70), retrieve the corresponding CID (72), then retrieve the original video from the IPFS (74) and display it to the user. The system facilitates either manual or automated comparison to find alterations (76). To implement automated comparison, the system is configured to align the segments of the video and audio tracks in the suspect and stored content file by automated content similarity analysis and return output of locations where the segments do not satisfy matching criteria, such as a correlation threshold. The system returns output indicating whether the content is authentic based on the matching criteria (78), and also returns output indicating segments that do not satisfy the matching criteria.

Figure 7:
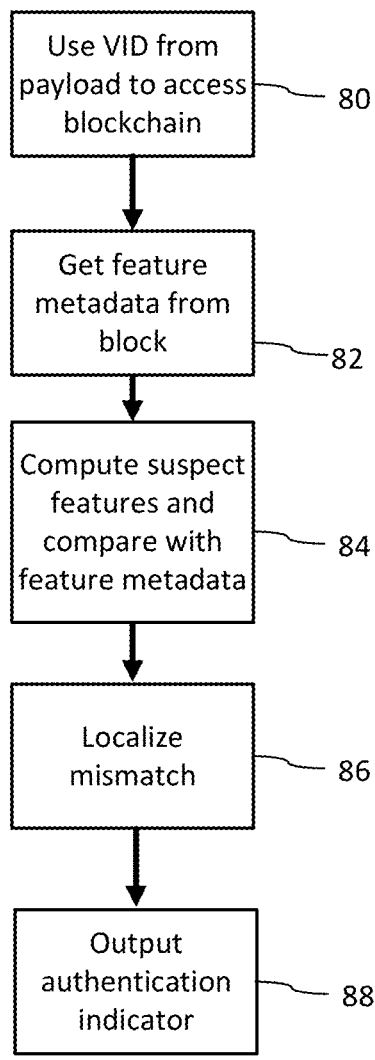
FIG. 7 is a diagram of a process of authenticating and localizing alteration using a watermark to access metadata in a blockchain.

FIG. 7 is a diagram illustrating another second stage authentication process. The system can also retrieve metadata stored in the blockchain and use it to perform further forensic analysis. In this process, the system uses the index in the payload that points to the block where the metadata is stored in the blockchain to access the blockchain record (80). It issues a request for the metadata from the blockchain, and in response, receives the metadata (82) representing authentication features. It then proceeds to compute these same features from the suspect file (suspect features) and compares them with the feature metadata (84). It indicates mismatches between the metadata and suspect features and localizes alteration by reporting locations where the features do not satisfy match criteria (86). Exemplary methods for accomplishing these steps are as follows:

1. The system transcribes the suspected audio and checks if the transcription matches the transcription stored in the metadata.
2. The system detects the shot boundaries in the suspected video and checks if they match the shot boundaries included in the metadata,
3. The system detects the robust key points in the suspect video and compares them with those stored in the blockchain. These key points may be SIFT key points, MFCC coefficients, significant DCT coefficient, locations of peaks in the audio spectrogram, or other robust features used for audio and video fingerprinting.

The system declares the suspected video as fake (88) if it finds a mismatch between any measured feature and the corresponding feature included in the metadata.

Tracking Instances and Derivative Works of Videos

As highlighted above, an additional adaptation of the system is to employ serialized watermarks and blockchain to track distribution of instances (e.g., copies or equivalent content) and derivative works of an original video work (such as versions that are adapted from original video works). To track instances of a video distributed to different entities, each distribution of an instance of the video is given an instance identifier in its watermark payload (e.g., a form of unique serial number to differentiate instances of a video work distributed to different entities). The corresponding block in the blockchain also includes the identifier of the original video (such as the CID of the original video). The instance identifier is associated with a distribution transaction by associating the instance identifier with information about that distribution in the metadata stored in the blockchain. This metadata may include, for example, the name or identifier of a distributor and or recipient of the instance of the video for each transaction. In this manner, the blockchain stores a record of the distributions of instances of a video work and the distribution history for each instance. The blockchain can be queried using the identifier of the original work (e.g., its CID) to get a report of all distributions of that work. Additionally, the blockchain can be queried by the instance identifier to get the distribution path of that instance through the blocks recording the distribution transactions of that instance.

Additionally, or alternatively, the system tracks the path of distribution of a video work by associating each recipient with an account (e.g., via the account's public address) and recording distribution transactions between parties as a transfer from one account to another. To find the distribution path of a particular video, the blockchain is queried with the identifier of the video (e.g., either its CID or its instance identifier) to find all accounts and the path through the accounts that the video has travelled.

Additional adaptations of these configurations provide means to track derivative works of original video works. A derivative work is created when an original video is modified. A derivative work may be created from an original work, or a previously created derivative work, which is modified again. In the latter case, the previously created derivative work becomes the original work from which a new derivative work is created.

As noted, there are a variety of ways to implement the means to track derivative works. In a first embodiment, the above described IPLD and IPNS are used to create a version control data structure for tracking the derivative works of an original video. This version control data structure has an address in the IPNS where this structure is located. The blockchain employs the address of the version control data structure (a pointer to the structure) to refer to the original video and its versions. When the original video is updated to create a derivative work, the new version is added to the version control data structure. Additionally, a block is added to the blockchain to record the transaction in which the derivative work is created and distributed. In this manner, blocks in the blockchain of the transactions for creating and distributing the derivative work refer to the address of the updated version control data structure. The blockchain records all transactions of an original work and its derivatives by including the identifier of the original work and the new derivative work, as well the pointer to the version control data structure. The version control information is stored in the version control data structure. With each derivative work created, the version control data structure is updated with a new version identifier of the new version (the new derivative work) in a version numbering scheme. The changes made to create the derivative video work relative to the original video work can be stored efficiently in the IPFS, or may be stored in some other file system. The new derivative work in this file system data store is referenced in the version control data structure by an address or addresses of the components for the video in the file system.

In another embodiment, version control is managed by recording the creation and distribution of a derivative work in the blockchain and relating blocks of original and derivative works by recording the identifier of the original video in each block of the blockchain involving the original video or its derivative work. When a new video is created from an original work, a new VID is created for that new video and embedded in a watermark in the new video. The VID may be created by concatenating the block number and transaction number to form a VID, which in turn, is embedded in the new video. The above IPLD scheme for keeping a record of the new video and its watermarked version in IPFS may be used for this embodiment. For each derivative work created from an original work, the corresponding blocks in the blockchain for the derivative work transactions also include the identifier of the original video work (e.g., its CID). To construct a report of version creation, the blockchain is queried for all blocks containing the original video work's identifier. The distribution path and editing path can be traced through the blockchain by following the path of transactions via the linking of the blocks in the blockchain between entities that are parties to the transactions. Those transactions can include distributions of a derivative work and creations of new derivative works.

Yet another embodiment is to track versions among accounts, where the accounts represent the videos. The blockchain traces the processing of a video work through the flow of video transactions (video updates or distributions), which are recorded as transactions of a video's account. Every video has an account, and through that account, the blockchain keeps track of what happened to the video. This is akin to a user's bitcoin account, which is represented as a public key serving as an address for bitcoin transactions into and out of the user's account. Everything that happens to a video is determined by interrogating the blockchain to recover the transactions involving the account for the video. These transactions in the blocks in the blockchain indicate which derivative works were created for an original video and which entities were involved in modifying or distributing the video. In one variant of this approach, the video accounts are public addresses in the blockchain, and transactions involving the video are associated with that public address.

The features of these embodiments are not mutually exclusive and may be combined in whole or in part to leverage the advantages of each part in various combinations. Transactions in videos can be recorded in the blockchain via accounts, blocks for transactions of videos identified via their identifiers (e.g., the VID in the watermark and/or CIDs of original and modified videos), and/or links in blocks to data structures keeping track of versions.

The rights of an entity to access and distribute original and derivative works from the file system may be controlled via smart contracts, such as those created in the Ethereum system. These smart contracts can control conditional access rights of authorized users of the system, such as rights that limit a party's ability to distribute, view or modify video. When conditional rights expire, e.g., due to payment terms, a temporal duration, or combination thereof, the smart contract in the system governing these rights executes and prevents further use, access, or distribution rights.

While the above descriptions refer to video, the same approaches apply to other forms of content, including audio-only and image-only content. They may also be applied to physical objects by encoding the watermark on images applied to the physical object, by any of various means, such as printing, engraving, embossing, ablation, etc. In this manner, supply chain distribution of physical objects can be tracked via transactions appended to the blockchain, where the watermark in the physical object links the physical object to each of its transaction blocks in the blockchain.

Operating Environment

The operations of the systems and processes, such as watermark embedding, reading and authentication operations, are implemented in modules. Notwithstanding any specific discussion of the embodiments set forth herein, the term "module" refers to software, firmware or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in Matlab, C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as field programmable gate arrays (FPGAs) and computer processors comprising one or more individual instruction processing cores, state machine circuitry, or firmware that stores instructions executed by programmable circuitry. "Processor" is intended to encompass processor types, such as CPUs, GPUs, DSPs, and the like, including microprocessors and computer processors with plural processing units or processing cores.

Implementation can additionally, or alternatively, employ special purpose electronic circuitry that has been custom-designed and manufactured to perform some or all of the component acts, as an application specific integrated circuit (ASIC). To realize such an implementation, the relevant module(s) (e.g., embedding and reading digital watermarks, hashing, fingerprinting, feature extraction, per above, with respect to image, audio, video or text content) are first implemented using a general purpose computer, using software such as MATLAB (from Mathworks, Inc.). A tool such as HDLCoder (also available from MathWorks) is next employed to convert the MATLAB model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Figure 8:
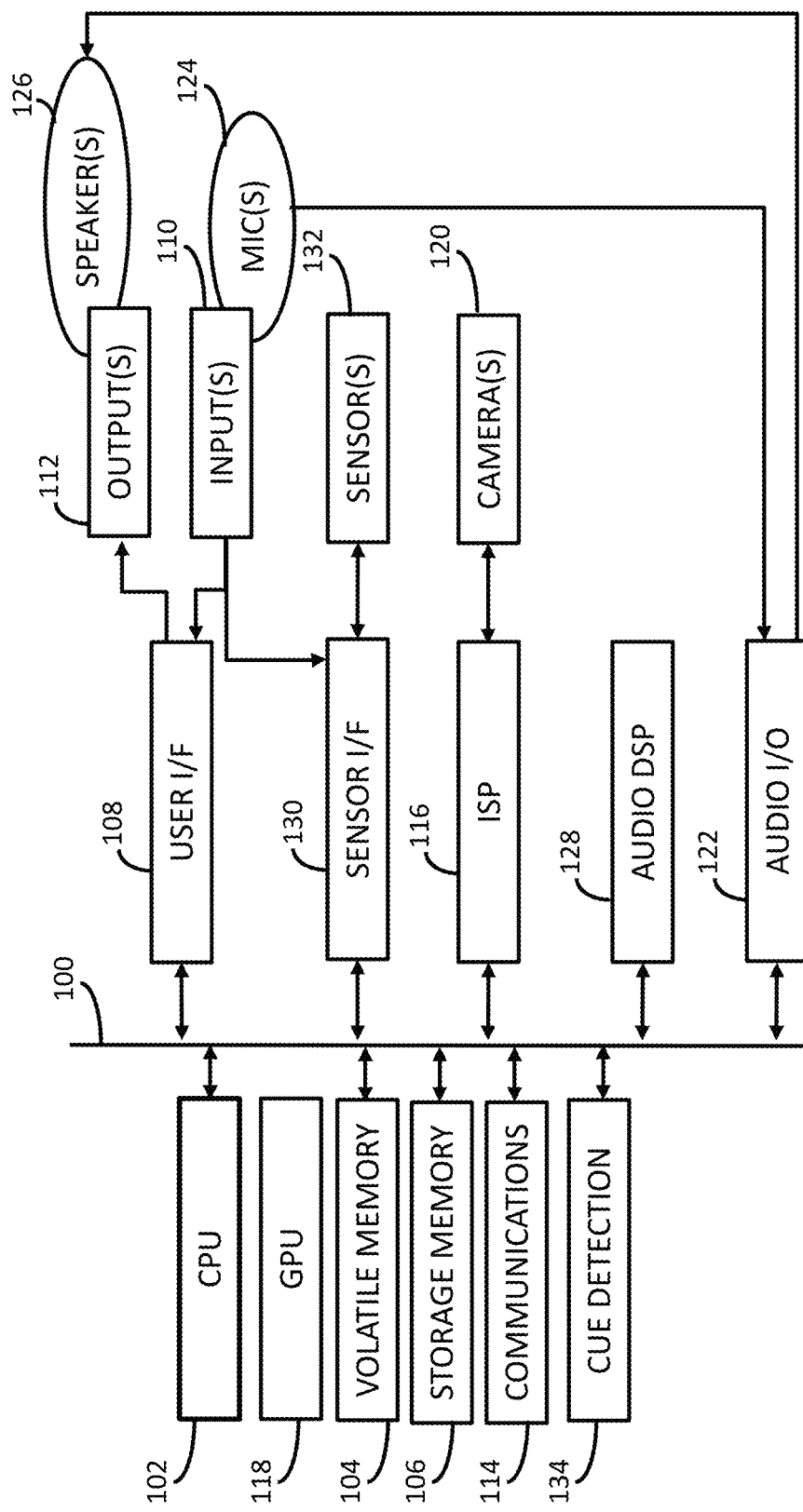
FIG. 8 is a diagram of an operating environment of embodiments of the invention.

For the sake of illustration, FIG. 8 is a diagram of an electronic computer device in which the components of the above embodiments may be implemented. It is not intended to be limiting, as the embodiments may be implemented in other computer device architectures or electronic circuitry.

Referring to FIG. 8, a system for an electronic device includes bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 8 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be a microprocessor, mobile application processor, etc., known in the art (e.g., a Reduced Instruction Set Computer (RISC) from ARM Limited, the Krait CPU product-family, a X86-based microprocessor available from the Intel Corporation including those in the Pentium, Xeon, Itanium, Celeron, Atom, Core i-series product families, etc.). The CPU 102 runs an operating system of the electronic device, runs application programs (e.g., mobile apps such as those available through application distribution platforms such as the Apple App Store, Google Play, etc.) and, optionally, manages the various functions of the electronic device. The CPU 102 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device. The electronic device may also include a volatile memory 104 electrically coupled to bus 100. The volatile memory 104 may include, for example, any type of random access memory (RAM). Although not shown, the electronic device may further include a memory controller that controls the flow of data to and from the volatile memory 104. The electronic device may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the invention, the storage memory 106 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof.

Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like. Application software typically includes an application program that helps users solve problems, perform tasks, render media content, retrieve (or access, present, traverse, query, create, organize, etc.) information or information resources on a network (e.g., the World Wide Web), a web server, a file system, a database, etc. Examples of software components include device drivers, software CODECs, message queues or mailboxes, databases, etc. A software component can also include other data or parameter to be provided to application software, a web application, or the like or any combination thereof. Examples of data files include media content files, like image files, text files, audio files, video files, haptic signature files, and the like.

Also connected to the bus 100 is a user interface module 108. The user interface module 108 is configured to facilitate user control of the electronic device. Thus, the user interface module 108 may be communicatively coupled to one or more user input devices 110. A user input device 110 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 108 may also be configured to indicate, to the user, the effect of the user's control of the electronic device, or any other information related to an operation being performed by the electronic device or function otherwise supported by the electronic device. Thus, the user interface module 108 may also be communicatively coupled to one or more user output devices 112. A user output device 112 can, for example, include a display (e.g., a liquid crystal display (LCD), a light emitting diode (LED) display, an active-matrix organic light-emitting diode (AMOLED) display, an e-ink display, etc.), a light, a buzzer, a haptic actuator, a loud speaker, or the like or any combination thereof.

Generally, the user input devices 110 and user output devices 112 are an integral part of the electronic device; however, in alternate embodiments, any user input device 110 (e.g., a microphone, etc.) or user output device 112 (e.g., a loud speaker, haptic actuator, light, display, or printer) may be a physically separate device that is communicatively coupled to the electronic device (e.g., via a communications module 114). A printer encompasses different devices for applying our encoded signals to objects, such as 2D and 3D printers (ink jet, offset, flexographic, laser, gravure, etc.), and equipment for etching, engraving, embossing, or laser marking.

Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, or by any other image sensors, thereby generating image data. General functions typically performed by the ISP 116 can include Bayer transformation, demosaicing, noise reduction, image sharpening, or the like or combinations thereof. The GPU 118 can be configured to process the image data generated by the ISP 116, thereby generating processed image data. General functions typically performed by the GPU 118 include compressing image data (e.g., into a JPEG format, an MPEG format, or the like or combinations thereof), creating lighting effects, rendering 3D graphics, texture mapping, calculating geometric transformations (e.g., rotation, translation, etc.) into different coordinate systems, etc. and sending the compressed video data to other components of the electronic device (e.g., the volatile memory 104) via bus 100. The GPU 118 may also be configured to perform one or more video decompression or decoding processes. Image data generated by the ISP 116 or processed image data generated by the GPU 118 may be accessed by the user interface module 108, where it is converted into one or more suitable signals that may be sent to a user output device 112 such as a display, printer or speaker.

Also coupled to the bus 100 is an audio I/O module 122, which is configured to encode, decode and route data to and from one or more microphone(s) 124 (any of which may be considered a user input device 110) and loud speaker(s) 126 (any of which may be considered a user output device 110). For example, sound can be present within an ambient, aural environment (e.g., as one or more propagating sound waves) surrounding the electronic device. A sample of such ambient sound can be obtained by sensing the propagating sound wave(s) using one or more microphones 124, and the microphone(s) 124 then convert the sensed sound into one or more corresponding analog audio signals (typically, electrical signals), thereby capturing the sensed sound. The signal (s) generated by the microphone(s) 124 can then be processed by the audio I/O module 122 (e.g., to convert the analog audio signals into digital audio signals) and thereafter output the resultant digital audio signals (e.g., to an audio digital signal processor (DSP) such as audio DSP 128, to another module such as a song recognition module, a speech recognition module, a voice recognition module, etc., to the volatile memory 104, the storage memory 106, or the like or any combination thereof). The audio I/O module 122 can also receive digital audio signals from the audio DSP 128, convert each received digital audio signal into one or more corresponding analog audio signals and send the analog audio signals to one or more loudspeakers 126. In one embodiment, the audio I/O module 122 includes two communication channels (e.g., so that the audio I/O module 122 can transmit generated audio data and receive audio data simultaneously).

The audio DSP 128 performs various processing of digital audio signals generated by the audio I/O module 122, such as compression, decompression, equalization, mixing of audio from different sources, etc., and thereafter output the processed digital audio signals (e.g., to the audio I/O module 122, to another module such as a song recognition module, a speech recognition module, a voice recognition module, etc., to the volatile memory 104, the storage memory 106, or the like or any combination thereof). Generally, the audio DSP 128 may include one or more microprocessors, digital signal processors or other microcontrollers, programmable logic devices, or the like or combination thereof. The audio DSP 128 may also optionally include cache or other local memory device (e.g., volatile memory, non-volatile memory or a combination thereof), DMA channels, one or more input buffers, one or more output buffers, and any other component facilitating the functions it supports (e.g., as described herein). In one embodiment, the audio DSP 128 includes a core processor (e.g., an ARM® AudioDE™ processor, a Hexagon processor (e.g., QDSP6V5A, QDSP6)) or Snapdragon processor, as well as a data memory, program memory, DMA channels, one or more input buffers, one or more output buffers, etc. Although the audio I/O module 122 and the audio DSP 128 are illustrated as separate components, it will be appreciated that the audio I/O module 122 and the audio DSP 128 can be functionally integrated together. Further, it will be appreciated that the audio DSP 128 and other components such as the user interface module 108 may be (at least partially) functionally integrated together.

The aforementioned communications module 114 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G, LTE, 5G, Li-Fi (e.g., for IR- or visible-light communication), sonic or ultrasonic communication, etc.), or the like or any combination thereof. In one embodiment, the communications module 114 may include one or more microprocessors, digital signal processors or other microcontrollers, programmable logic devices, or the like or combination thereof. Optionally, the communications module 114 includes cache or other local memory device (e.g., volatile memory, non-volatile memory or a combination thereof), DMA channels, one or more input buffers, one or more output buffers, or the like or combination thereof. In one embodiment, the communications module 114 includes a baseband processor (e.g., that performs signal processing and implements real-time radio transmission operations for the electronic device).

Also connected to the bus 100 is a sensor interface module 130 communicatively coupled to one or more sensors 132. A sensor 132 can, for example, include an accelerometer (e.g., for sensing acceleration, orientation, vibration, etc.), a magnetometer (e.g., for sensing the direction of a magnetic field), a gyroscope (e.g., for tracking rotation or twist), a barometer (e.g., for sensing altitude), a moisture sensor, an ambient light sensor, an IR or UV sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.), a gas or other chemical sensor, or the like or any combination thereof. Although separately illustrated in FIG. 8, a camera 120 or microphone 124 can also be considered a sensor 132. Generally, a sensor 132 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 132 coupled to the sensor interface module 130 are an integral part of the electronic device; however, in alternate embodiments, one or more of the sensors may be physically separate devices communicatively coupled to the electronic device (e.g., via the communications module 114). To the extent that any sensor 132 can function to sense user input, then such sensor 132 can also be considered a user input device 110. The sensor interface module 130 is configured to activate, deactivate or otherwise control an operation (e.g., sampling rate, sampling range, etc.) of one or more sensors 132 (e.g., in accordance with instructions stored internally, or externally in volatile memory 104 or storage memory 106, ROM, etc., in accordance with commands issued by one or more components such as the CPU 102, the user interface module 108, the audio DSP 128, the cue detection module 134, or the like or any combination thereof). In one embodiment, sensor interface module 130 can encode, decode, sample, filter or otherwise process signals generated by one or more of the sensors 132. In one example, the sensor interface module 130 can integrate signals generated by multiple sensors 132 and optionally process the integrated signal(s). Signals can be routed from the sensor interface module 130 to one or more of the aforementioned components of the electronic device (e.g., via the bus 100). In another embodiment, however, any signal generated by a sensor 132 can be routed (e.g., to the CPU 102), before being processed.

Generally, the sensor interface module 130 may include one or more microprocessors, digital signal processors or other microcontrollers, programmable logic devices, or the like or any combination thereof. The sensor interface module 130 may also optionally include cache or other local memory device (e.g., volatile memory, non-volatile memory or a combination thereof), DMA channels, one or more input buffers, one or more output buffers, and any other component facilitating the functions it supports (e.g., as described above). In one embodiment, the sensor interface module 130 may be provided as the "Sensor Core" (Sensors Processor Subsystem (SPS)) from Qualcomm, the "frizz" from Megachips, or the like or any combination thereof. Although the sensor interface module 130 is illustrated as an individual component, it will be appreciated that the sensor interface module 130 (or portions thereof) may be functionally integrated into one or more other components (e.g., the CPU 102, the communications module 114, the audio I/O module 122, the audio DSP 128, the cue detection module 134, or the like or any combination thereof).

CONCLUDING REMARKS

A system for detecting Deepfakes of media content, such as news videos, is described. The system is based on audio and video watermarking and blockchain technology. The system uses Digimarc robust audio and image watermark technologies. It also uses the IPFS and Ethereum blockchain technologies for storing the video and its metadata, which are used for video forensic analysis at the back end of the social media networks. Implementations are described along with results of their operations. The results indicate that digital watermarking technology can be used successfully to link the video to its original copy and to the metadata stored in a blockchain network. They also indicate that the watermark embedded in the video can be detected after applying Deepfakes. Proper countermeasures for the copy attack were described and should be in place to have an effective system. The system can be generalized to include puppet-master Deepfakes and types of video other than news video.

This disclosure incorporates by reference, in their entirety, the following references, including publications, patents and patent applications:

REFERENCES

I. J. Goodfellow, J. Pouget-Abadie, M. Mirza, B. Xu, D. Warde-Farley, S. Ozair, A. Courville and Y. Bengio, "Generative Adversarial Nets," in Proceedings of the International Conference on Neural Information Processing Systems (NIPS), 2014.

D. Harris, "Deepfakes: False Pornography is Here and Low Cannot Protect You," Duke Law & Technology Review, vol. 17, no. 1, pp. 99-128, 2018.

F. Matern, C. Riess and M. Stamminger, "Exploiting Visual Artifacts to Expose Deepfakes and Face Manipulations," in Proceedings of the IEEE Winter Applications of Computer Vision Workshops (WACVW), Waikoloa Village, HI, USA, USA, 2019.

M. Koopman, A. M. Rodriguez and Z. Geradts, "Detection of Deepfake Video Manipulation," in Proceedings of the 20th Irish Machine Vision and Image Processing conference (IMVIP), 2018.

X. Yang, Y. Li and S. Lyu, "Exposing Deep Fakes Using Inconsistent Head Poses," in Proceedings of the IEEE International Conference on Acoustics, Speech and Signal Processing (ICASSP), 2019.

Y. Li and S. Lyu, "Exposing DeepFake Videos By Detecting Face Warping Artifacts," in Proceedings of Computer Vision and Pattern Recogniton (CVPR), 2019.

S. Agarwal and H. Farid, "Protecting World Leaders Against Deep Fakes," in Proceedings of the Computer Vision and Pattern Recognition Conference (CVPR), 2019.

Y. Li, M.-C. Chang and S. Lyu, "In Ictu Oculi: Exposing AI Created Fake Videos by Detecting Eye Blinking," in Proceedings of the IEEE International Workshop on Information Forensics and Security (WIFS), 2018.

D. Guera and E. J. Delp, "Deepfake Video Detection Using Recurrent Neural Networks," in Proceedings of the IEEE International Conference on Advanced Video and Signal-based Surveillance (AVSS), 2018.

R. K. Sharma, B. A. Bradley, S. T. Shivappa, A. Kamath and D. A. Cushman, "Audio Watermark Encoding With Reversing Polarity and Pairwise Embedding". U.S. Pat. No. 9,305,559, 5 Apr. 2016.

A. R. Gurijala, S. T. Shivappa, R. K. Sharma and B. A. Bradley, "Human auditory system modeling with masking energy adaptation". U.S. Pat. No. 10,043,527, 7 Aug. 2018.

J. D. Lord, "Watermarking and Signal Recognition For Managing and Sharing Captured Content, Metadata Discovery and Related Arrangements". U.S. Pat. No. 9,454,789, 29 Nov. 2018.

A. M. Alattar, E. T. Lin and M. U. Celik, "Digital Watermarking of Low Bit-Rate Advanced Simple Profile MPEG-4 Compressed Video," IEEE Transactions on Circuits and Systems for Video Technology, vol. 12, no. 8, pp. 787-800, August 2003.

A. M. Alattar, E. T. Lin and M. U. Celik, "Digital Watermarking of Low Bit Rate Video". U.S. Pat. No. 8,638,978, 28 Jan. 2014.

T. F. Rodriguez and M. M. Weaver, "Robust Encoding of Machine Readable Information in Host Objects and Biometrics, and Associated Decoding and Authentication". U.S. Pat. No. 10,594,689, filed 4 Dec. 2016.

D. G. Lowe, "Distinctive Image Features from Scale-Invariant Keypoints," International Journal of Computer Vision, vol. 60, no. 2, p. 91-110, 2004.

A. Gervais, G. O. Karame, K. Wüst, V. Glykantzis, H. Ritzdorf and S. Capkun, "On the Security and Performance of Proof of Work Blockchains," in CCS 2016—Proceedings of the 2016 ACM SIGSAC Conference on Computer and Communications Security, Vienna, Austria, October 2016.

H. R. Hasan and K. Salah, "Combating Deepfake Videos Using Blockchain and Smart Contracts," IEEE Access, vol. 7, 2019.

M. Kutter, S. Voloshynovskiy and A. Herrigel, "The Watermark Copy Attack," in Proceedings of SPIE: Security and Watermarking of Multimedia Content II, San Jose, CA, USA, January 2000.

J. K. Barr, B. A. Bradley, B. T. Hannigan, A. M. Alattar and R. Durst, "Layered Security in Digital Watermarking". U.S. Pat. No. 8,190,901, 29 May 2012.

A. Alattar, "Authentication of Physical and Electronic Media Objects Using Digital Watermarks". U.S. Pat. No. 7,822,225, 26 Oct. 2019.

K. Zhan, Z. Zhang, Z. Li and Y. Qiao, "Joint Face Detection and Alignment Using Multi-task Cascaded Convolutional Networks," IEEE Signal Processing Letters (SPL), vol. 23, no. 10, pp. 1499-1503, 2016.

P. Cano, E. Batlle, H. Mayer and H. Neuschmied, "Robust Sound Modeling for Song Detection in Broadcast Audio," in Proceedings of the 112th AES Convention, 2002.

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the signal processing operations described above may be implemented as instructions stored in a non-transitory memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors, audio captured in audio sensors, as well as other physical signal types captured in sensors for that type. These electromagnetic signal representations are transformed to different states as detailed above to detect signal attributes, perform pattern recognition and matching, encode and decode digital data signals, calculate relative attributes of source signals from different sources, etc.

The above methods, instructions, and hardware operate on reference and suspect signal components. As signals can be represented as a sum of signal components formed by projecting the signal onto basis functions, the above methods generally apply to a variety of signal types. The Fourier transform, for example, represents a signal as a sum of the signal's projections onto a set of basis functions. Other examples of signal projections or transforms include Wavelet transforms and subband transforms. Still other examples include DCT, PCA, SVD, and KLT.

The particular combinations of elements and features in the above-detailed embodiments are exemplary only; the interchanging and substitution of these teachings with other teachings in this and the incorporated-by-reference patents/applications are also contemplated.

What is claimed is:

1. A method for authenticating media content comprising:
reading a digital watermark embedded in media content;
obtaining an index to a block in a blockchain from a digital watermark payload obtained from the digital watermark;
requesting metadata from the blockchain based on the index;
extracting features from the media content to yield extracted features;
checking for matching between the extracted features and stored features in the metadata obtained from the block in the blockchain; and
determining alteration in the media content by:
 detecting presence of valid digital watermarks in segments of the media content;
 checking consistency between digital watermarks in different portions of the media content; and
 checking a relationship of segment identifiers carried by digital watermarks in the segments.

2. The method of claim 1 wherein said extracting features comprises:
computing robust hashes of segments of the media content; and
storing the robust hashes in the metadata in the blockchain.

3. The method of claim 1 wherein extracting features comprises:
computing Mel Frequency Cepstrum (MFC) coefficients from audio segments of the media content; and
storing the MFC coefficients in the metadata in the blockchain.

4. The method of claim 1 further comprising:
dividing the media content into a plurality of segments;
embedding a digital watermark carrying a unique segment identifier per segment in each of the plurality of segments; and
checking for presence of valid segment identifier in at least some of the plurality of segments to detect alteration.

5. The method of claim 1 further comprising:
transcribing audio from the media content to generate a transcription;
storing the transcription in the metadata in the blockchain to yield a stored transcription; and
comparing a transcription of suspect audio against the stored transcription to detect alteration.

6. The method of claim 1 further comprising:
computing facial feature locations from video frames of the media content;
storing the facial feature locations in the metadata in the blockchain, said storing yielding stored facial feature locations; and
comparing facial feature locations in suspect video frames against the stored facial feature locations to detect alteration.

7. A method for authenticating media content comprising:
reading a digital watermark embedded in media content;
obtaining an index to a media content file from a digital watermark payload obtained from the digital watermark;
requesting the media content file based on the index;
checking for matching between extracted features and features in the media content file; and
determining whether the media content is an authorized derivative work by:
 extracting an identifier of an original work from a blockchain associated with the media content;
 retrieving blocks from a blockchain containing the identifier of the original work; and
 verifying that a valid creation transaction exists in the blockchain linking the original work to the media content as an authorized derivative work.

8. The method of claim 7 wherein the index comprises an index to a block in a blockchain, and the block in the blockchain provides an index to the media content file stored in a distributed storage system, wherein:
the distributed storage system divides the media content file into a plurality of chunks;
hashes the plurality of chunks to provide hashes that index the plurality of chunks in memory of the distributed storage system;
stores the plurality of chunks on different servers in the distributed storage system; and
provides a hash table storing the hashes that the distributed storage system uses as indexes to retrieve the plurality of chunks from the different servers.

9. The method of claim 7 further comprising:
recording a creation transaction in the blockchain that links an original work to the media content file;
embedding an identifier of the original work in a digital watermark in the media content file; and
verifying authenticity by confirming presence of a creation transaction in the blockchain.

10. The method of claim 7 further comprising:
assigning a unique instance identifier to a distributed instance of the media content file;
recording a distribution transaction in the blockchain using the unique instance identifier; and
tracking a distributed instance using a blockchain transaction.

11. The method of claim 7 further comprising:
storing chunks of the media content file on different servers in a distributed storage system;
computing hashes of the chunks to form a hash tree;
storing a root hash of the hash tree in the blockchain; and
using the root hash to verify integrity of the media content file.

12. The method of claim 7 wherein the index is associated with:
a block identifier from a blockchain transaction record; and
a distribution transaction.

13. The method of claim 7 further comprising:
recording version control information in blockchain transactions to track derivative works created from the media content file.

14. A system for authenticating media content comprising:
a watermark reader configured to read a digital watermark embedded in media content;
a blockchain interface configured to:
 obtain an index to a block in a blockchain from a watermark payload obtained from the digital watermark;
 request metadata from the blockchain based on the index;
a feature extractor configured to extract features from the media content; and
an authentication module configured to:
 check for matching between the extracted features and stored features in the metadata obtained from the block in the blockchain;

detect presence of valid watermarks in segments of the media content;

check consistency between watermarks in different portions of the media content by verifying that interdependent payload portions between the different portions match; and check a relationship of segment identifiers embedded as watermarks in the segments to detect alteration through frame removal, alteration or repetition.

15. The system of claim 14 wherein the feature extractor is configured to:

compute robust hashes of segments of the media content; and store the robust hashes in the metadata in the blockchain.

16. The system of claim 14 wherein the authentication module is configured to:

detect presence of valid digital watermarks in segments of the media content;

check consistency between digital watermarks in different content tracks; and check an order of segment identifiers embedded as digital watermarks.

17. The system of claim 14 further comprising:
a distributed storage system configured to:
divide the media content into chunks;
store the chunks on different servers;
compute hashes of the chunks; and
provide a hash table for retrieving the chunks.

18. The system of claim 14 further comprising:
a version control module configured to:
record creation and distribution of derivative works in the blockchain;
relate blocks of original and derivative works using identifiers; and
track relationships between original works and authorized derivatives.

19. The system of claim 14 further comprising:
a transcription module configured to generate text transcriptions from audio content; wherein the authentication module is configured to compare transcriptions to detect audio alterations.

20. The system of claim 14 wherein the feature extractor is configured to:
compute facial feature locations from video frames; wherein the authentication module is configured to compare facial feature locations to detect video alterations.

* * * * *